United States Patent [19]

Kitaoka et al.

[11] Patent Number: 4,724,306

[45] Date of Patent: Feb. 9, 1988

[54] WEIGHING SYSTEM

[75] Inventors: Takashi Kitaoka, Ohtsu; Michiyasu Hikita, Kusatsu; Hatsuo Kawaguchi, Shiga, all of Japan

[73] Assignee: Ishida Scales Mfg. Co., Ltd., Kyoto, Japan

[21] Appl. No.: 795,316

[22] Filed: Nov. 6, 1985

[30] Foreign Application Priority Data

| Nov. 7, 1984 | [JP] | Japan | 59-234596 |
| Nov. 7, 1984 | [JP] | Japan | 59-234597 |
| Apr. 2, 1985 | [JP] | Japan | 60-69807 |
| Jul. 10, 1985 | [JP] | Japan | 60-152090 |

[51] Int. Cl.⁴ .................................. G06F 15/24
[52] U.S. Cl. ................................ 235/385; 235/383
[58] Field of Search ........................... 235/385, 383

[56] References Cited

U.S. PATENT DOCUMENTS 3,737,631 6/1973 Harris .................................. 235/385
4,591,705 3/1986 Youdou .............................. 235/385

FOREIGN PATENT DOCUMENTS 56-51623 5/1981 Japan .
56-51624 5/1981 Japan .
60-1664 1/1985 Japan .

Primary Examiner—Harold I. Pitts
Attorney, Agent, or Firm—Staas & Halsey

[57] ABSTRACT

A weighing system for computing the prices of articles purchased by customers includes cards (4) containing codes for discriminating the customers. The card (4) is inserted in a card reader (16) attached to an electronic scale (1), and the prices of articles weighed by the electronic scale (1) are totaled for each of the codes of the cards (4).

24 Claims, 23 Drawing Figures

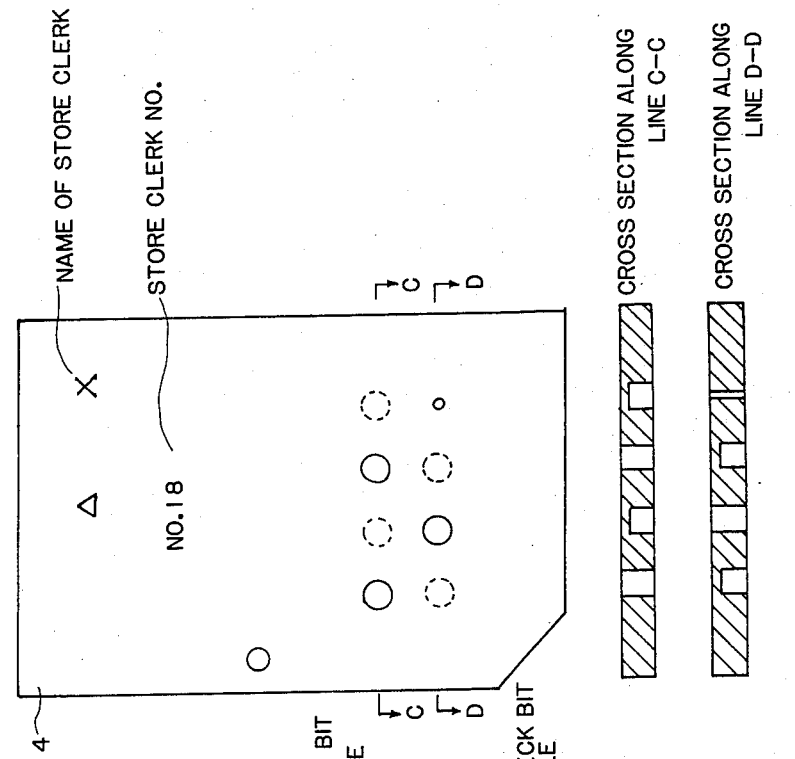
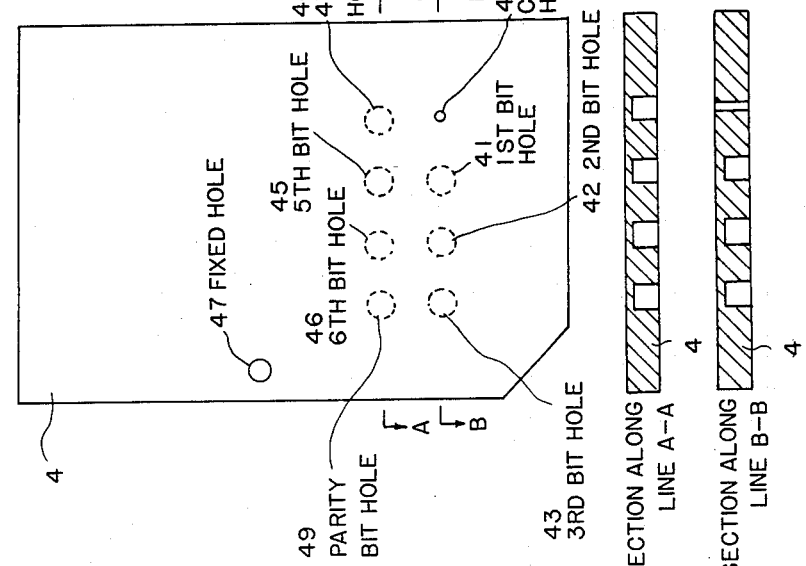

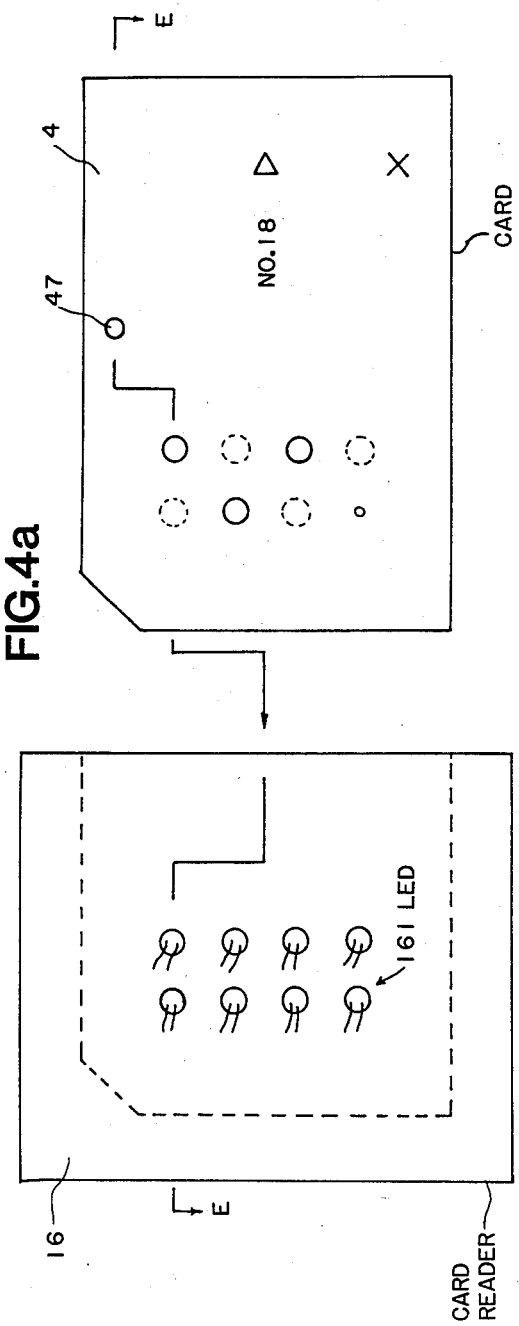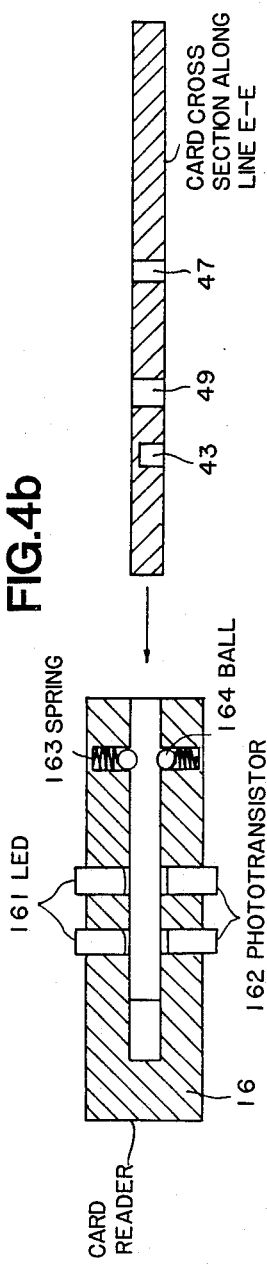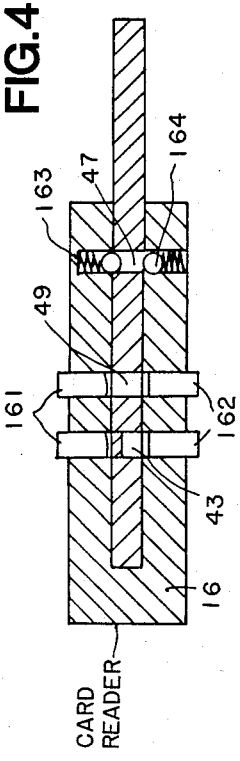

FIG.7-2a

EXAMPLE OF PRINTED RECEIPT
(RECEIPT PRINTER)

```
     PURCHASE SLIP
       THANK YOU

8/28/1984
   ¥/100g NET(g) PRICE(¥)
   ROAST BEEF SLICE
   238  399      949

BEEF ROUND SLICE
   338  307     1037

ROAST PORK SLICE
   238  242      575

PORK HAM SLICE
   188  284      533

CHICKEN WHITE SLICE
   299  157      469

TOTAL 3563
          R18
```

CARD NO.

LABEL (SUBTOTAL LABEL)
PRINTED WHEN
SUBTOTAL KEY
IS TURNED ON

FIG.7-2b

EXAMPLES OF PRINTED LABEL (LABEL PRINTER)

(I)
```
ROAST BEEF SLICE
PROCESSED DATE  ¥/100g    NET (g) PRICE (¥) 18
8/28/1984        238      399    949
TO BE REFRIGERATED BELOW 10°C
THANK YOU
```

(II)
```
BEEF ROUND SLICE
PROCESSED DATE  ¥/100g    NET(g) PRICE(¥) 18
8/28/1984        338      307    1037
TO BE REFRIGERATED BELOW 10°C
THANK YOU
```

(III)
```
ROAST PORK SLICE
PROCESSED DATE  ¥/100g    NET(g) PRICE (¥) 18
8/28/1984        238      242    575
TO BE REFRIGERATED BELOW 10°C
THANK YOU
```

(IV)
```
PORK ROUND SLICE
PROCESSED DATE    ¥/100g  NET(g) PRICE(¥) 18
8/28/1984         188     284    533
TO BE REFRIGERATED BELOW 10°C
THANK YOU
```

(V)
```
CHICKEN WHITE MEAT
PROCESSED DATE  ¥/100g    NET(g) PRICE(¥) 18
8/28/1984        299      157    469
TO BE REFRIGERATED BELOW 10°C
THANK YOU
```

CARD NO.

(VI)
```
PROCESSED DATE  ¥/100g    NET(g) PRICE(¥) 18
8/28/1984        5 PIECES       3563
TO BE REFRIGERATED BELOW 10°C
THANK YOU
```

LABELS PRINTED EACH TIME ARTICLES ARE WEIGHTED

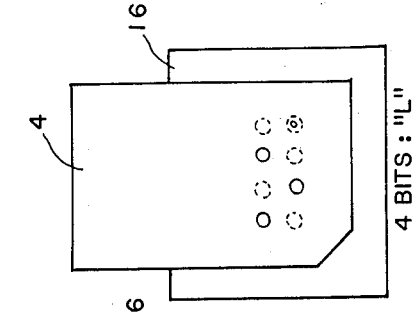
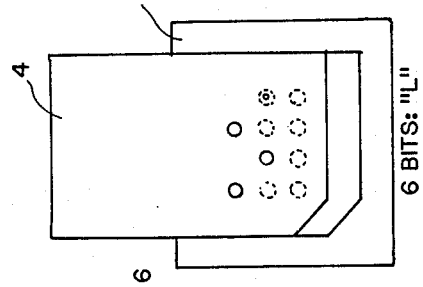
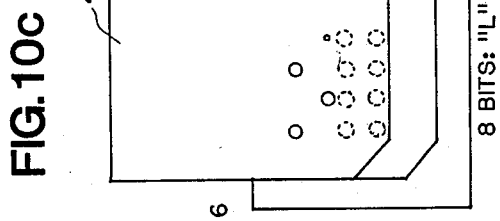
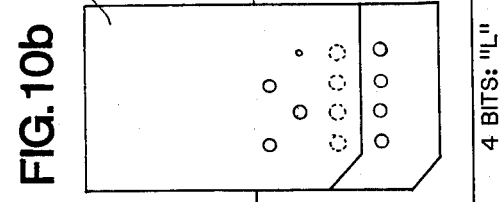
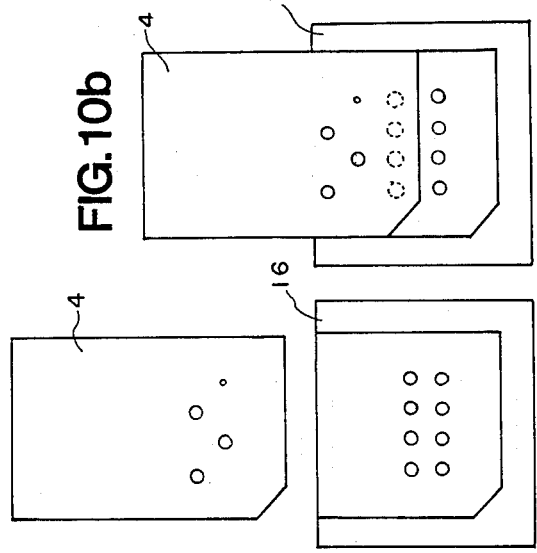

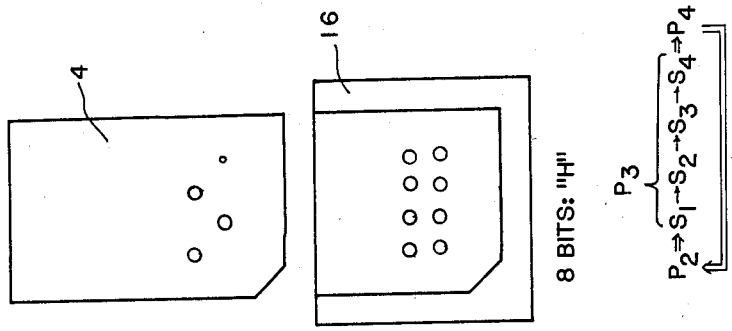
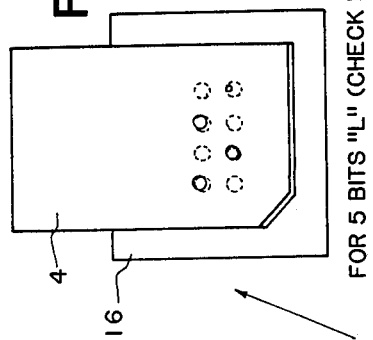
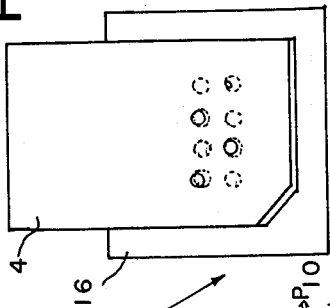
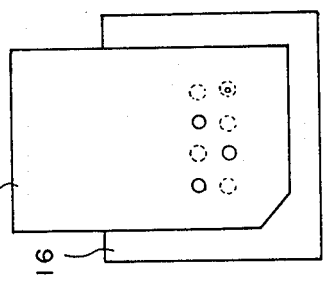

FIG.12a FIG.12b FIG.12c FIG.12d FIG.12e

4 BITS: "L"
4 BITS: "H" (CHECK BIT: "H")
$P_8 \Rightarrow S_1 \to S_2 \to S_5 \to S_6 \to S_{13} \to S_{14} \to S_{19} \to P_6$
$P_9$
$P_8 \Rightarrow S_1 \to S_2 \to S_5 \to S_6 \to S_{13} \to S_{14} \to S_{19} \to P_{10}$ FOR 6 BITS: "L"
2 BITS: "H" (CHECK BIT: "H")
$P_8 \Rightarrow S_1 \to S_2 \to S_5 \to S_6 \to S_{13} \to S_{14} \to S_{15}$
$P_{10} \Leftarrow S_1 \to S_8 \to S_7 \to S_{27} \to P_3 \Rightarrow P_4$
$P_1 \Rightarrow P_2 \Rightarrow P_2 \Rightarrow P_3 \Rightarrow P_4$ 8 BITS: "L" (CHECK BIT: "L")
$P_2 \Rightarrow S_1 \to S_2 \to S_5 \to S_9 \to S_7 \to S_8$
$S_5 \to S_2 \to S_1 \to P_2 \to P_4 \Rightarrow S_8$
$S_9 \to S_{10} \to S_{11} \to S_{12} \to S_8$ 7 BITS: "L" (CHECK BIT: "L")
1 BIT: "L"
$P_8 \Rightarrow S_1 \to S_2 \to S_5 \to S_9 \to S_7 \to S_8 \to P_{10} \to P_1$
$P_4 \Leftarrow P_3 \Leftarrow P_2$ 4 BITS: "H" (CHECK BIT: "H")
4 BITS: "L"
① $P_2 \Rightarrow S_1 \to S_2 \to S_5 \to S_6 \to S_{13} \to S_{14}$
$P_4 \Leftarrow S_{18} \to S_7 \to S_6 \to S_{15}$
② $P_2 \Rightarrow S_1 \to S_2 \to S_5 \to S_6 \to S_{13} \to S_{14}$
$P_2 \Rightarrow S_1 \to S_2 \to S_5 \to S_6 \to S_{12} \to S_{19}$
$P_4 \Leftarrow S_{21} \to S_{20} \to S_{19}$
(101) $P_2 \Rightarrow S_1 \to S_2 \to S_5 \to S_6 \to S_{12} \to S_{19}$
$S_{23} \to S_{22} \to S_{21} \to S_{20} \to S_{19}$
$S_{24} \Rightarrow P_4 \Rightarrow P_5$ (ARRANGEMENT OF WEIGHING SYSTEM)

(ARRANGEMENT OF EACH RECEIPT ISSUING MACHINE)

PROGRAM FOR PROCESSING ON KEY

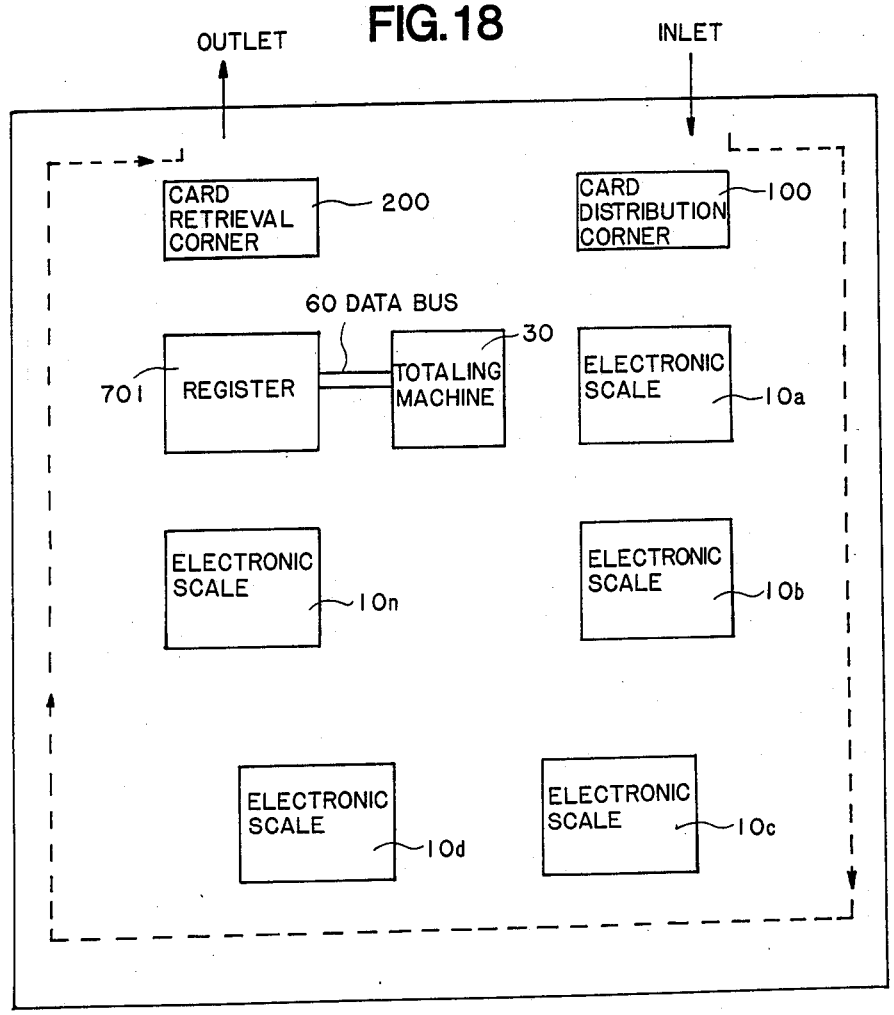

WEIGHING SYSTEM

BACKGROUND OF THE INVENTION

The present invention relates to a weighing system for weighing meats and other perishables for sale in large-scale stores.

Some stores or markets have a plurality of electronic scales placed on showcases and having label printers for weighing goods such as meats, daily dish materials, and other perishables for sale. Each article purchased by a customer is weighed and labeled by a closest electronic scale with a label printer, and the customer is supposed to pay at a check-out counter for all purchased goods.

When totaling the amounts due, the cashier has to enter the prices printed on the labels as inputs into her cash register. Therefore, the amount of work to be done by the cashier is large, and the efficiency is relatively poor when many customers are waiting for check-out. Another problem is that errors are liable to happen when prices are manually input to the cash register Too many such input errors may impair the store's profit.

To avoid the above drawbacks, it has been proposed to connect a plurality of electronic scales to one cash register for transmitting price data computed by each electronic scale to the cash register, as disclosed in Japanese Laid-Open Patent Publication Nos. 56(1981)-51623 and 56(1981)-51624.

In the above prior art systems, an electronic scale which is used is designated by the cash register, and the price of a purchased article is entered from the designated electronic scale. When a plurality of customers weigh and label their purchased articles on two or more electronic scales, the customers' amounts due cannot be discriminated, resulting in incorrect calculations.

There has been employed a weighing system in which a plurality of electronic scales are interconnected by a bus, and the prices of articles weighed by store clerks or customers are totaled by each of the electronic scales. When computing the amount due for a customer, the total price of articles purchased is computed by any one of the electronic scales for the same store clerk or customer, and the computed total is printed on a label or receipt.

In this weighing system, the store clerk is required to select and push his clerk number key among a plurality of clerk number keys each time an article is weighed and sold. Therefore, the weighing system has had the following problems:

(1) When the store clerk is quite busy as by giving service to many customers, he or she is likely to push wrong clerk number keys.

(2) If clerk number keys (clerk numbers) are changed, wrong clerk number keys are apt to be pushed.

(3) Where there are many store clerks, many clerk number keys are required, and the key input unit is large in size.

(4) If there are many clerk number keys, it is time-consuming for a clerk to locate his or her clerk number key, and a wrong clerk number key tends to be pushed.

Japanese Patent Publication No. 60(1985)-1664 discloses a system in which the charge-indicating scales at stores are connected to a bank's computer so that the amount due for an article purchased by a person in one of such stores can automatically be withdrawn from his or her acount in the bank.

This system has however been disadvantageous in that communication lines dedicated for data transmission are required to be connected between the charge-indicating scales in the stores and the bank, and the stores and the users must have accounts open in the bank. Therefore, service is available to only a limited number of people.

SUMMARY OF THE INVENTION

In view of the aforesaid problems of th prior art weighing systems, it is an object of the present invention to provide an electronic scale system for allowing users to pay the charge with cards at stores.

Another object of the present invention is to provide a weighing system in which the codes of customers or store clerks are inputted so that it is not necessary to search for key numbers, and hence no wrong store clerk or customer numbers are entered regardless of the number of store clerks involved, in which when store clerk codes are changed, cards are changed or newly prepared to thereby prevent input errors, and in which a card reader is prevented from getting large in size even if the number of store clerks involved is large.

Still another object of the present invention is to provide a weighing system in which a plurality of electronic scales are provided in a store, and when a plurality of customers purchase articles in the store, the amounts due for the goods purchased by the respective customers can accurately be totaled without inputting the prices at a check-out counter.

A still further object of the presen invention is to provide a weighing system in which when information is stored in a card, the forming accuracy of the card is not required to be extremely high, and in which the information stored in the card can properly be read even if the card reader does not have a microswitch which would detect complete insertion of the card.

According to the present invention, there is provided a weighing system for computing the prices of articles purchased by customers, comprising cards containing codes for discriminating the customers, an electronic scale including a card reader for reading out the codes from the cards, and means for computing the prices of articles which have been weighed and for totaling the computed prices respectively for the codes as read out.

According to the present invention, there is also provided a weighing system for computing the prices of articles purchased by customers, comprising cards containing codes for discriminating the customers, a plurality of electronic scales for computing the prices of articles which have been weighed, each of said electronic scales including a card reader for reading out the codes from the cards, and a receipt issuing machine connected by a bus to the electronic scales and having means for storing data transferred from the electronic scales and means for reading and printing on receipts purchase data from the codes for the customers.

According to the present invention, there is also provided a weighing system for computing the prices of articles purchased by customers, comprising cards capable of storing and reading out at least price data on articles purchased by the customers, an electronic scale having means for storing said data in the cards and means for weighing the articles and computing the prices thereof, means for reading out the data from said cards, and a register for totaling the prices of the articles purchased by the customers based on the data as read out.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 3(a) and 3(b) are plan and cross sectional views of cards employed in the weighing system;

FIGS. 4(a) through 4(c) are plan and cross sectional views showing the relationship between the cards and a card reader;

FIGS. 6, 7-1 through 7-2b, 8, 9-1, and 9-2 are flowcharts of the operation of the weighing system shown in FIG. 1;

FIG. 7-2 is a plan view of a receipt and labels printed by a printer;

FIGS. 10a through 10e, 11a through 11c and 12a through 12e are plan views showing the relationship between the cards and the card reader;

FIGS. 15-1, 15-2, 16, 17-1, 17-2, and 17-3 are flowcharts of the operation of the weighing system shown in FIG. 13; and FIG. 18 is a block diagram of a weighing system according to still another embodiment of the present invention.

DESCRIPTION OF THE PREFERRED EMBODIMENTS

Figure 1:
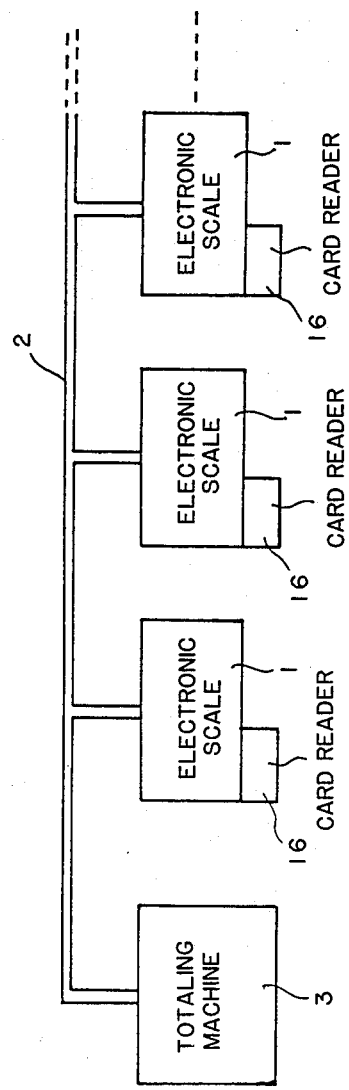
FIG. 1 is a block diagram of a weighing system according to an embodiment of the present invention.

FIG. 1 schematically shows a weighing system according to an embodiment of the present invention. The weighing system includes a plurality of electronic scales 1 provided in a store and interconnected by a bus 2 to each other and also to a totaling machine 3.

Figure 2:
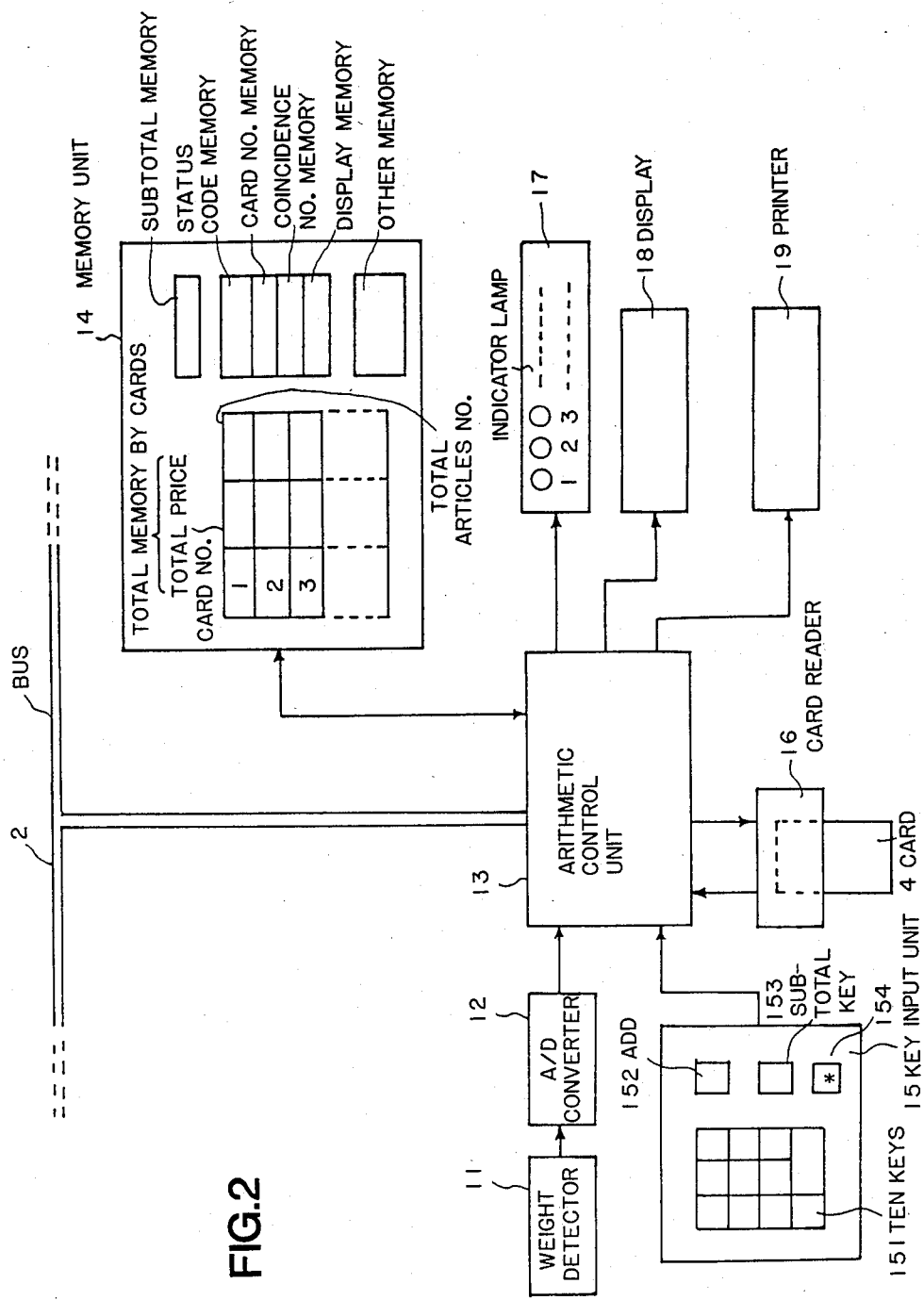
FIG. 2 is a block diagram of an electronic scale in the weighing system shown in FIG. 1.

As shown in FIG. 2, each of the electronic scales 1 has a weight detector 11, an A/D converter 12 for converting an analog weight signal from the weight detector 11 into a digital signal, an arithmetic control unit 13 primarily comprising a microcomputer responsive to the digital signal from the A/D converter 12 for computing prices and other data, a memory unit 14 for storing article codes, unit prices and other data, a key input unit 15 for entering article access numbers and the like, a card reader 16 for reading a card 4 containing the number of a store clerk or a customer, an indicator lamp 17, a display 18 for displaying the unit price, weight, price and the like of an article, and a printer 19 for printing the name, unit price, price and the like of an article on a label or a receipt. The memory unit 14 contains an article code memory, a unit price memory, a card number memory, a total memory by card numbers, a subtotal memory, a coincidence number memory, a display memory, and other memories.

Operation of the electronic scale 1 will be described below. The weight of an article detected by the weight detector 11 is converted by the A/D converter 12 into a digital value which is applied to the arithmetic control unit 13. The store clerk enters the access number of the weighed article through ten keys 151 of the key input unit 15, and the arithmetic control unit 13 reads out the unit price, name code and the like of the article which are stored in the corresponding memories of the memory unit 14. Then, the arithmetic control unit 13 checks to determine if the clerk or customer card 4 has been inserted in the card reader 16, and computes the price of the article. Based on the computed price, the display 18 displays the unit price, weight, price and the like. When an add key 152 in the key input unit 15 is pushed, the arithmetic control unit 13 energizes the indicator lamp 17 which indicates an addition process for the card number. The printer 19 prints necessary items such as the unit price, weight, price and the like on a label or a receipt based on the computed result. The arithmetic control unit 13 also stores the total price and the total article number in the total memory by cards in the memory unit 14 in dependence upon on the card number. The data stored in the total memory by cards is transmitted to an electronic scale which indicates the total price for the customer to pay the amount due. The subtotal memory in the memory unit 14 is employed for computing the amount due.

The card 4 and the card memory 16 used in the electronic scale 1 will be described hereinbelow.

FIG. 3(a) shows a card which does not include a clerk number, and FIG. 3(b) shows a card in which a clerk number has been entered. The card 4 has a fixed hole 47 defined through its base, a check bit hole 48 of the smallest diameter defined through the base, a parity bit hole 49 defined on one surface of the base, and first through sixth bit holes 41 through 46 defined on the surface of the base. The card 4 may double as the name card of a clerk. As shown in FIG. 3(b), a clerk number 18, for example, can be expressed by punching out the second bit hole 42, the fifth bit hole 45, and the parity bit hole 49.

FIG. 4 shows the relationship between the card 4 containing the clerk number and the card reader 16 for reading the card 4. The card reader 16 has as many light-emitting diodes 161 and phototransistors 162 as the number of holes, the light-emitting diodes 161 and the phototransistors 162 being positioned respectively on opposite sides of a plane in which the card 4 is to be inserted. The card reader 16 also has springs 163 and balls 164 thereon for fixing the inserted card 4 therein. When the card 4 is inserted into the card reader 16 from the position of FIGS. 4(a) and 4(b) to the position of FIG. 4(c), the balls 164 are urged by the springs 163 to engage the fixed hole 47 for positioning the card 4 in the card reader 16. The positions of the through holes in the card 4 are detected by the light-emitting diodes 161 and the phototransistors 162 for reading out the clerk number.

Figure 5:
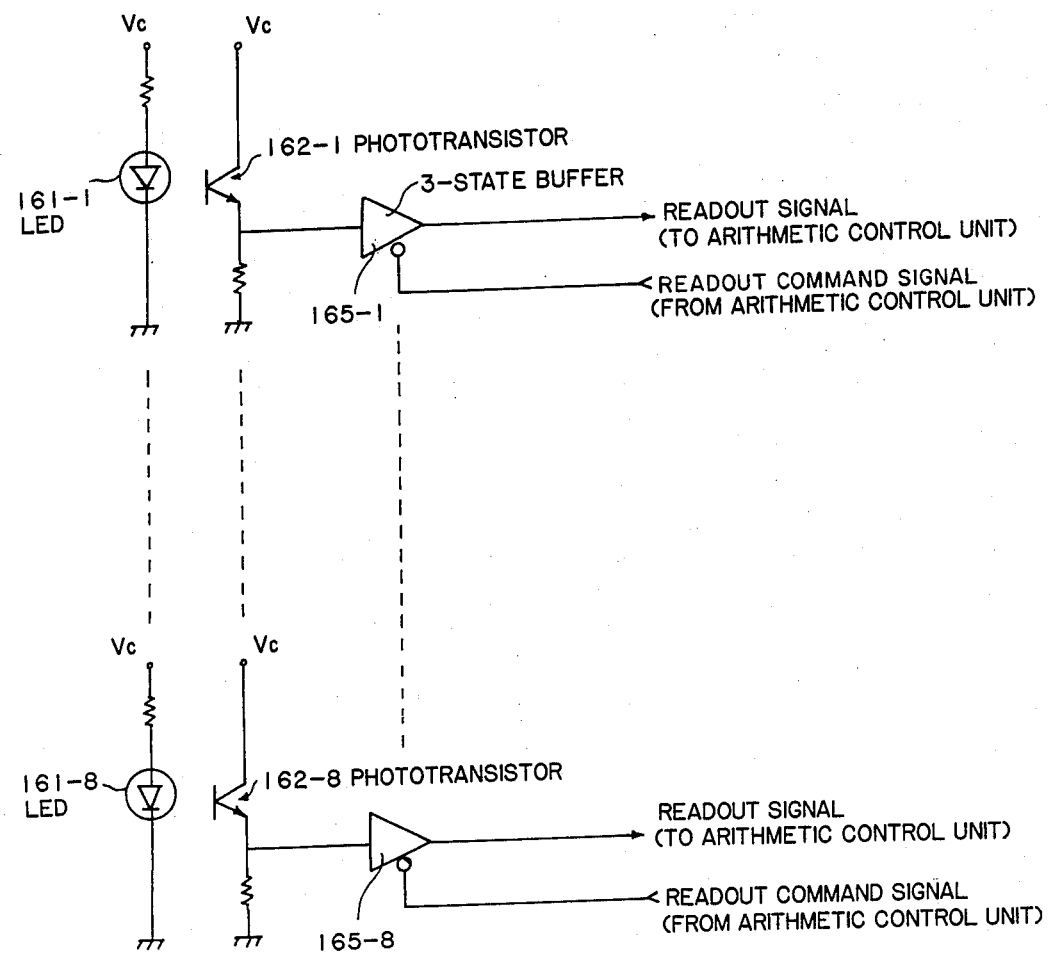
FIG. 5 is a circuit diagram of the card reader.

FIG. 5 is a circuit diagram of the card reader 16 for reading out a card number. The phototransistors 162-1 through 162-8 are disposed in confronting relation to the light-emitting diodes 161-1 through 161-8, respectively, and have output terminals connected respectively to three-state buffers 165-1 through 165-8 which transmit readout signals to the arithmetic control unit 13 and are supplied with readout command signals from the arithmetic control unit 13. The arithmetic control unit 13 performs a prescribed process in response to the readout signals from the three-state buffers 165-1 through 165-8.

Figure 6:
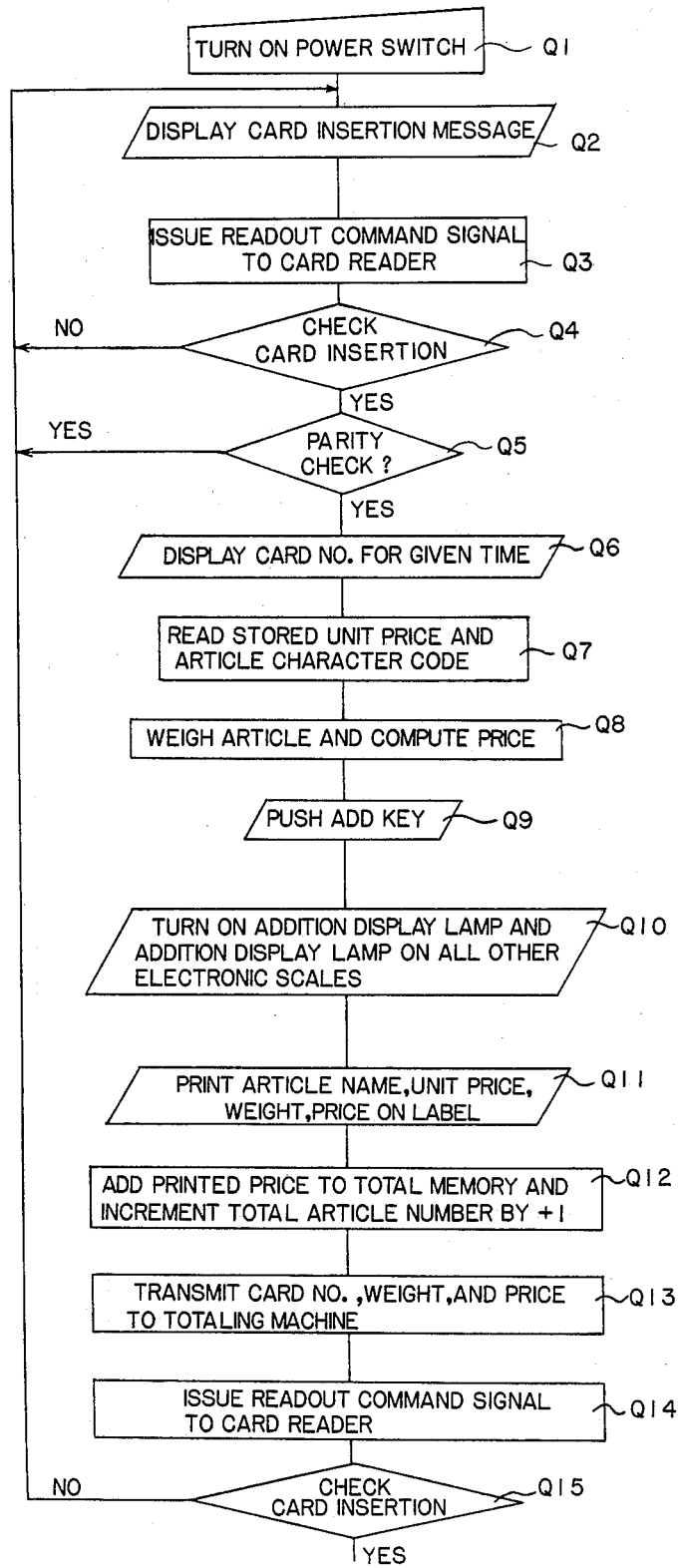

Operation of the electronic scale in the weighing system will be described with reference to the flowchart of FIG. 6.

(1) The program for the arithmetic control unit 13 is started by turning on a power supply switch in a step Q1. The arithmetic control unit 13 displays a message indicating insertion of the card 4 on a weight and unit price display section of the display 18 in a step Q2. At this time, a price display section of the display 18 is blank, i.e., displays nothing. Then, the arithmetic control unit 13 issues a readout command signal to the card reader 16 and receives therefrom a readout signal from the phototransistors 162-1 through 162-8 in a step Q3. Thereafter, the arithmetic control unit 13 checks to determine if the card 4 is inserted or not based on the readout signal in a step Q4. If the card is not inserted, no further processing is effected. Therefore, the arithmetic control unit 13 carries out the weighing process after confirming the card insertion.

(2) If the card 4 is inserted in the card reader 16, then the arithmetic control unit 13 confirms an odd parity check based on the readout signal (readout data) in a step Q5. If the result of the parity check is correct, the readout data, (i.e., the card number) is displayed on the price display section of the display 18 for a prescribed period of time, e.g., 5 seconds, in a step Q6. Then, an access number is entered through the ten keys 151 to read out the unit price, article character code and the like from memory areas of the memory unit 14 in a step Q7. The readout unit price is displayed on the unit price display section of the display 18.

(3) The arithmetic control unit 13 then computes the price of the article based on the weight value detected by the weight detector 11 in a step Q8. The add key 152 is pushed in a step Q9 to energize the addition indicator lamp 17 corresponding to the card number, and the addition indicator lamps 17 corresponding to the card number in all of the other electronic scales in a step Q10. The name, unit price, weight, price and other data for the weighed article are printed on a label in a step Q11.

(4) The arithmetic control unit 13 stores and adds the printed price to the total price for the card number in the total memory by cards, and increments the total article number by +1 in a step Q12. Then, the arithmetic control unit 13 transmits the card number, the weight, the price, and the like to the totaling machine in a step Q13. The totaling machine 3 totals the data by the article classifications, the card numbers, and the time zones.

(5) The arithmetic control unit 13 issues a readout command signal to the card reader 16 and receives the readout signal in a step Q14. After the article has been weighed and the label has been printed, the arithmetic control unit 13 checks to determine if the card 4 has been removed, based on the readout signal, in a step Q15. If the card 4 still remains inserted, then a next article is weighed or a subtotal label is issued. If the card 4 is not preset in the card reader 16, the arithmetic control unit 13 returns to the step Q2.

Figures 1, 7:
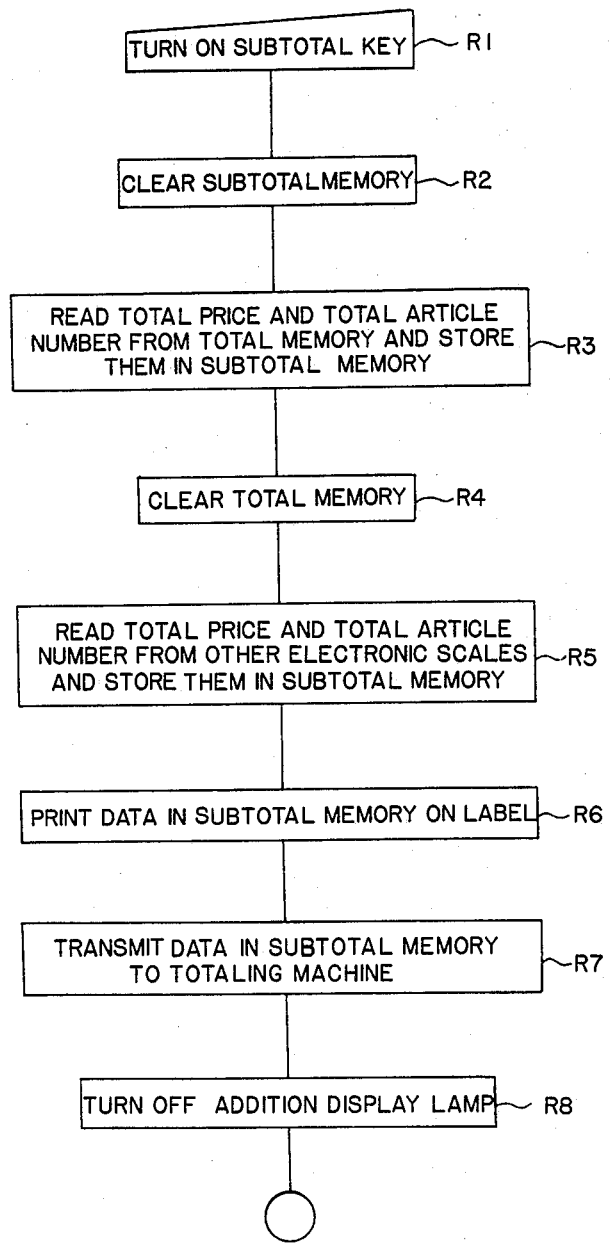

FIG. 7-1 is a flowchart of operation for issuing a subtotal label (payment label) on a certain electronic scale.

(1) With the card 4 inserted in the card reader 16, the subtotal key 153 is pushed in a step R1, and the subtotal memory of the memory unit 14 is cleared to zero in a step R2. Then, the arithmetic control unit 13 reads the total price and the total article number for this card from the total memory by the cards of the memory unit 14 of this electronic scale, and stores them in the subtotal memory in a step R3. The arithmetic control unit 13 thereafter clears the total price and the total article number from the total memory by the cards in a step R4.

(2) The arithmetic unit 13 successively reads the total prices and the total article numbers from the other electronic scales, and stores them in the subtotal memory in a step R5. Then, the stored data (the total price and the total article number for this card) in the subtotal memory is printed on a label by the printer 19 in a step R6. Then, the arithmetic control unit 13 transmits the data from the subtotal memory to the totaling machine 3 in a step R7, and de energizes the addition indicator lamp 17 corresponding to this card number in a step R8. On the electronic scales accessed in the step R5, the stored data are cleared to zero and the addition indicator lamps are de-energized after the total prices and the total article numbers have been transmitted to the electronic scale in question.

FIG. 7-2 shows a receipt and labels printed by the printer 19. In FIG. 7-2(a), the printer 19 is a receipt printer which totals the prices of the purchased articles and prints the card number and the total price. In FIG. 7-2(b), the printer 19 is a label printer, and article labels (I) through (V) are printed by the printers of the respective electronic scales. A subtotal label (VI) is printed by the printer of an electronic scale for settling the amount due.

The present inveniton is not limited to the illustrated arrangement, but is also applicable to a weighing system employing only one electronic scale.

The card and the card reader may be arranged as follows:

(1) Magnets are embedded in holes of a card, and means such as Hall-effect elements are provided in a card reader for detecting the magnets to read the card number; or (2) A magnetic card and a magnetic detector head are used in combination.

The card may be used in the following manner:

(1) One store clerk with his card follows each customer, and uses the card for weighing articles, computing the prices, and printing data using printers at respective electronic scales involved.

(2) A card is given to each customer at the entrance of a store, and is received by a clerk at an electronic scale each time an article is weighed and sold. It is not necessary for a clerk to follow each customer.

The manner in which information on the card 4 is read out will be described hereinbelow.

Figure 8:
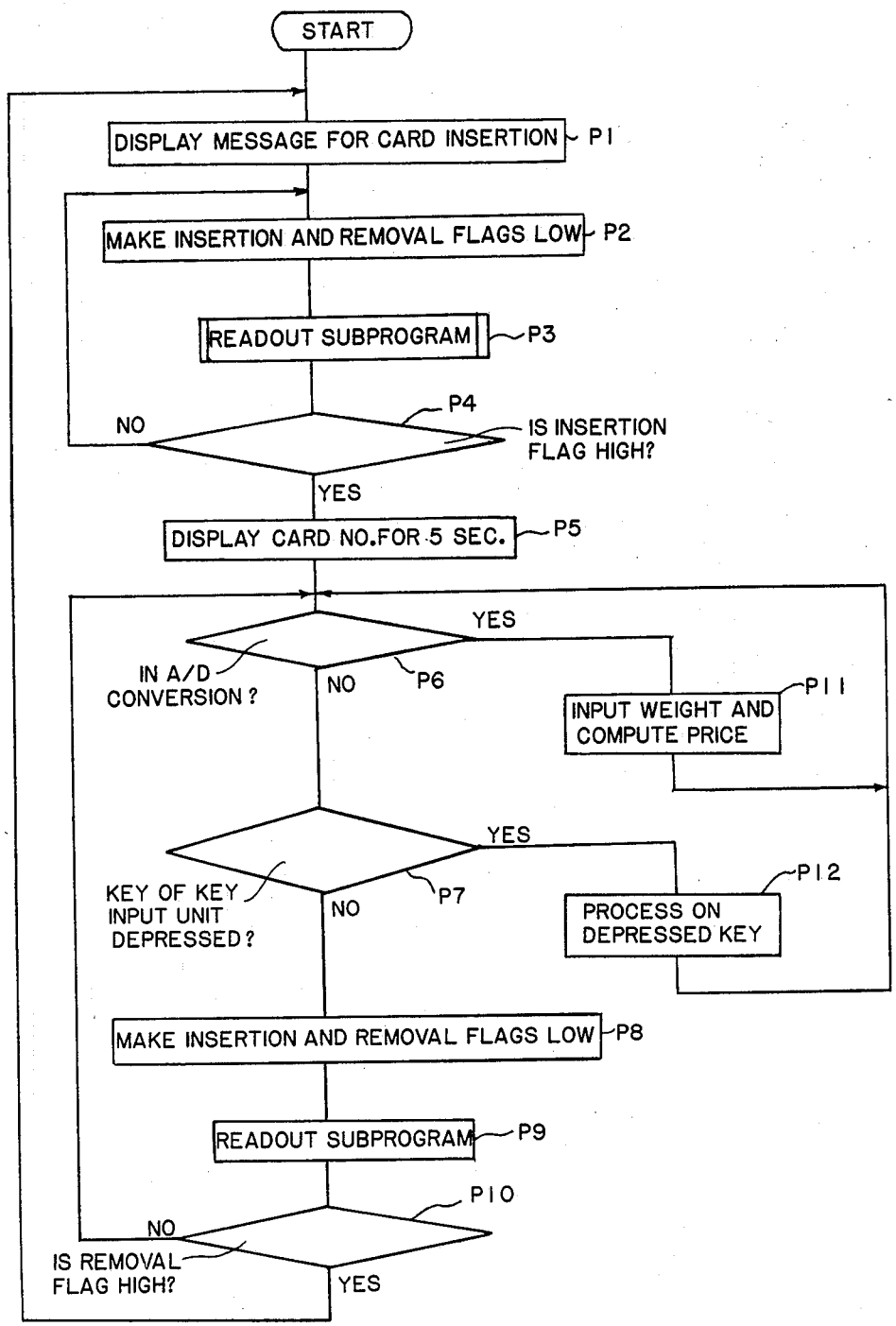

FIG. 8 is a flowchart of a main program for reading out card information.

(1) The display 18 displays a message indicating that the card 4 is inserted in a step P1. Then, the arithmetic control unit 13 makes card insertion and removal flags low in a step P2. A readout subprogram (step P3) will be described later with reference to FIGS. 9-1 and 9-2.

(2) The arithmetic control unit 13 checks to determine if the insertion flag is high or not in a step P4. If the insertion flag is high, then the arithmetic control unit 13 displays the data (card number) of the display memory described later on, on the display 18 for a prescribed interval of time, e.g., 5 seconds, in a step P5. Then, the arithmetic control unit 13 confirms whether the A/D converter 12 is in operation in a step P6. If the operation of the A/D converter 12 is completed, the weight is inputted to compute the price in a step P11.

(3) If the A/D converter 12 is in operation, then the arithmetic control unit 13 checks to determine if the keys of the key input unit 15 are turned on or not in a step P7. If any key is turned on, the process based on the depressed key is effected in a step P12. If no key is depressed, the arithmetic control unit 13 makes the insertion and removal flags low in a step P8, effects the readout subprogram in a step P9, and checks to determine if the removal flag is high or not in a step P10. If the removal flag is high, then the program goes back to the step P1, and if not high, then the program goes back to the step P6.

Figures 1, 9:
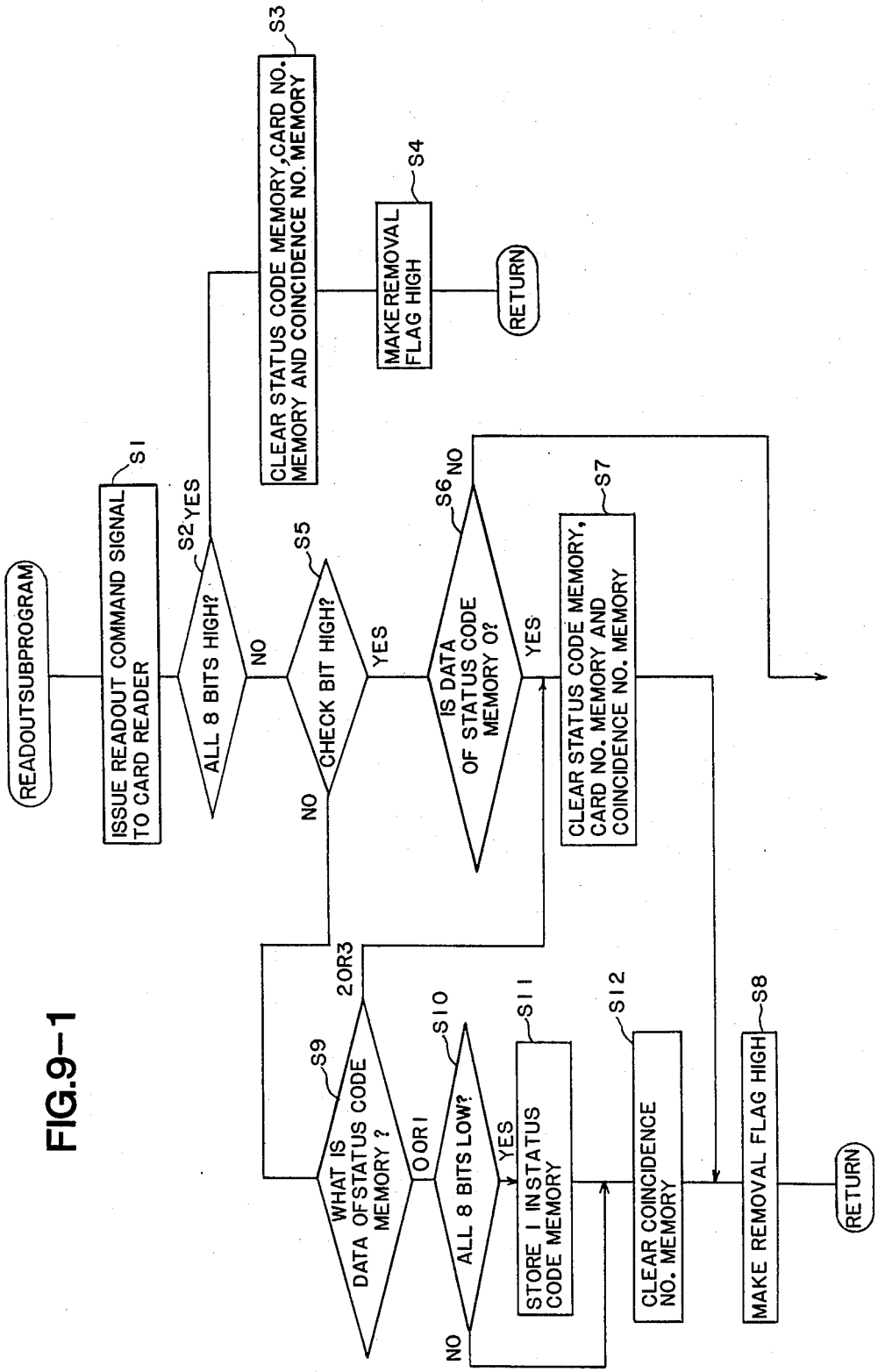
Figures 2, 9:
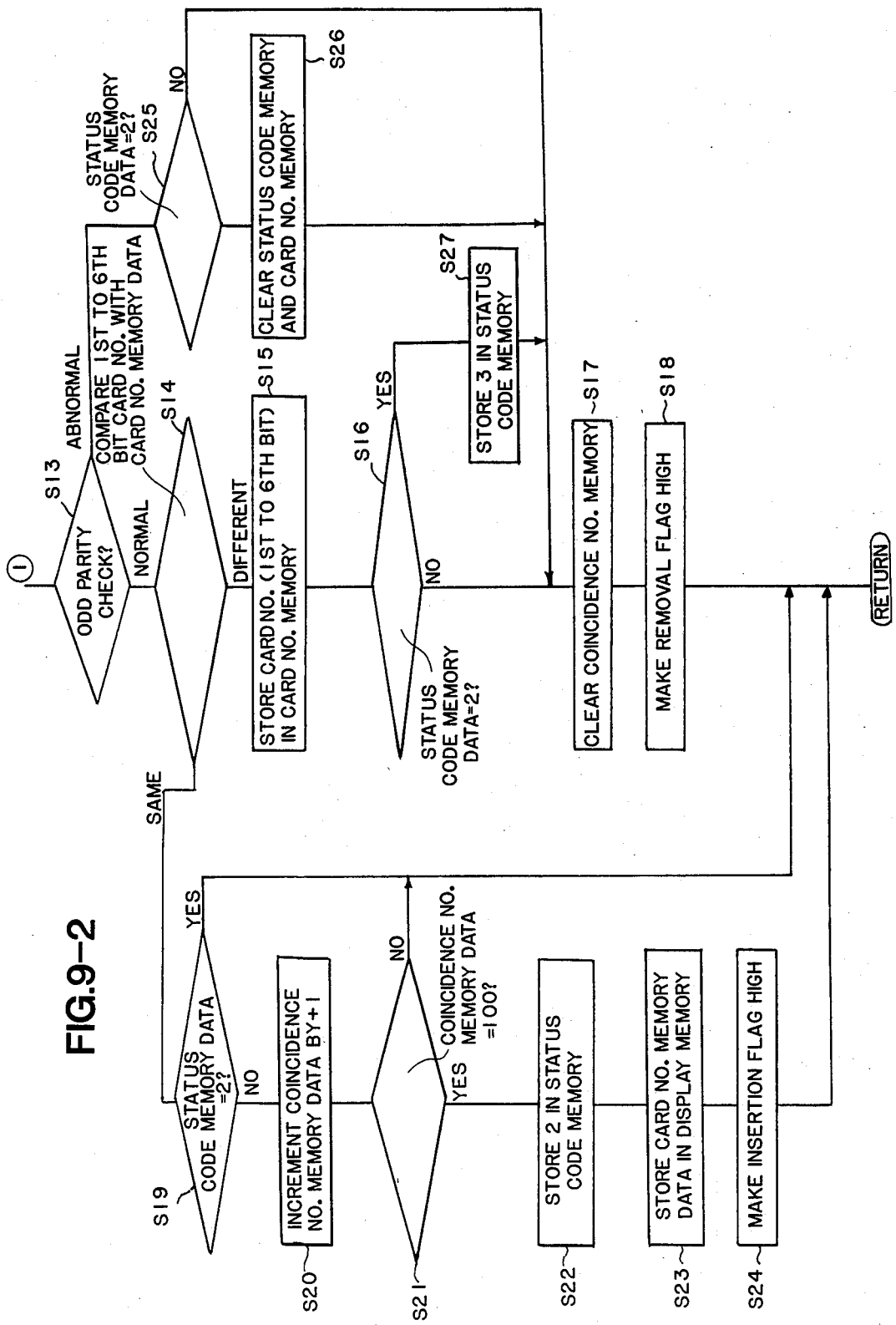

FIGS. 9-1 and 9-2 are illustrative of the flowchart of the readout subprogram (P3).

(1) When the readout subprogram is started, the arithmetic control unit 13 issues a readout command signal to the card reader 16 to receive 8-bit readout data (signal) therefrom in a step S1.

The 8-bit readout data, i.e., the output signal from the phototransistors 162-1 through 162-8, is composed of first through sixth bits indicative of a card number, a check bit, and a parity bit. The arithmetic control unit 13 checks to determine if the 8 bits of the readout data are all high in a step S2. The phototransistors 162-1 through 162-8 generate high signals when they detect light and low signals when they do not detect light. If all of the 8 bits are high, the card is not detected, and the arithmetic control unit 13 clears the status code memory, the card number memory, and the coincidence number memory of the memory unit 14 in a step S3, makes the removal flag high in a step S4, and then returns to the main program.

(2) If not all of the 8 bits are high, but one or more bits are low, then the arithmetic control unit 13 checks if the check bit is high or not in a step S5. If the check bit is high, the phototransistors are detecting light, and the arithmetic control unit 13 then confirms whether the content of the status code memory of the memory unit 14 is zero ("0") in a step S6.

The content of the status code memory is "0" when all of the 8 bits are high, i.e., the card is not detected, and is "1" when all of the 8 bits are low. When the card number, as read out, coincides with the card number memory data 100 times, then the content of the status code memory is caused to be "2". When the card number as read out becomes different from the card number memory data after it coincides with the card number memory data 100 times, then the content of the status code memory is caused to be "3".

If the content of the status code memory is not zero, the arithmetic control unit 13 executes a step S13 and the following steps. If the content of the status code memory is zero, then the arithmetic control unit 13 clears the status code memory, the card number memory, and the coincidence number memory to zero in a step S7, makes the removal flag high in a step S8, and returns to the main program.

(3) If the check bit is not high in the step S5, light from the light-emitting diodes is blocked, and the arithmetic control unit 13 checks the content of the status code memory in a step S9. If the content of the status code memory is "2" or "3", then the step S7 is executed. If the content of the status code memory is "0" or "1", then the arithmetic control unit 13 checks to determine if all of the 8 bits are low or not in a step S10. If all of the 8 bits are low, then "1" is stored in the status code memory in a step S11, the coincidence number memory is cleared to zero in a step S12, and the removal flag is rendered high in the step S8.

(4) If the content of the status code memory is not zero, then the arithmetic control unit 13 effects odd parity checking, i.e., checks to determine if the number of high signals at the first through sixth bits and the parity bit is odd or not in a step S13 (FIG. 9-2). If the odd parity is normal, the arithmetic control unit 13 compares the card number represented by the first through sixth bits with the card number memory data in a step S14. If the compared numbers are not the same, then the arithmetic control unit 13 stores the entered card number (first through sixth bits) into the card number memory of the memory unit 14 in a step S15, and checks to determine if the content of the status code memory is "2" in a step S16. If the content of the status code memory is "2", then the arithmetic control unit 13 stores "3" in the status code memory in a step S27. If the content of the status code memory is not "2", then the arithmetic control unit 13 clears the coincidence number memory in a step S17 and makes the removal flag high in a step S18.

(5) If the entered card number and the card number memory data coincide with each other in the step S14, the arithmetic control unit 13 checks to determine if the content of the status code memory is "2" in a step S19. If the content of the status code memory is "2", then the program returns to the main routine. If not "2", then the arithmetic control unit 13 increments the data of the coincidence number memory by +1 in a step S20, and checks to determine if the content of the coincidence number memory is "100" in a step S21. If not "100", then the program returns to the main routine, and if "100", the arithmetic control unit 13 stores "2" in the status code memory in a step S22, and stores the content (card number) of the card number memory in the display memory in a step S23. Then, the arithmetic control unit 13 makes the insertion flag high in a step S24 and returns to the main program.

(6) If the result of the odd parity check in the step S13 is abnormal, then the arithmetic control unit 13 checks to determine if the content of the status code memory is "2" in a step S25. If it is "2", the arithmetic control unit 13 clears the status code memory and the card number memory in a step S26.

FIG. 10 is a view showing operation of the card reader when the card is inserted therein.

FIG. 10(a) shows the position in which the card 4 with the card number contained as shown in FIG. 3(b) is completely removed from the card reader 16. In this position, the outputs or readout data from the phototransistors 162-1 through 162-8 are all high for 8 bits, and the arithmetic control unit 13 executes the steps S1 to S2 to S3 to S4 in the flowchart of FIG. 9-1, and makes the removal flag high. Therefore, the arithmetic control unit 13 executes the steps P4 to P2 in the flowchart of the main routine of FIG. 8, i.e., makes the removal flag low and then executes the above steps of FIG. 9-1.

FIG. 10(b) shows the position in which the card 4 is inserted in the card reader 16 with four bits low and four bits high, i.e., four phototransistors detect light and four phototransistors detect no light, with the check bit high. Therefore, the arithmetic control unit 13 executes the steps S1 to S2 to S5 to S6 to S7 to S8 in the flowchart of FIG. 9-1 and returns to the main routine of FIG. 8.

FIG. 10(c) illustrates the position in which the card 4 is inserted to make all of the 8 bits including the check bit low, i.e., no light is detected by all of the phototransistors. In this position, the arithmetic control unit 13 sets the status code memory to "1", and executes the steps S1 to S2 to S5 to S9 to S10 to S11 to S12 to S8 in the flowchart of FIG. 9-1.

FIG. 10(d) shows the position in which six bits are low and two bits including the check bit are high. In the step S14 of FIG. 9-2, the entered card number represented by the first to sixth bits is not equal to the content of the card number memory since the card number memory is initially cleared to zero. Therefore, the arithmetic control unit 13 executes (1) the steps S1 to S2 to S5 to S6 to S13 to S14 to S15 to S16 to S17 to S18, and then returns to the main routine of FIG. 8. When the subprogram of FIGS. 9-1 and 9-2 is executed, the arithmetic control unit 13 effects (2) the steps S1 to S2 to S5 to S6 to S13 to S14 to S19 to S20 to S21 and returns to the main program of FIG. 8.

FIG. 10(e) shows the position in which the card 4 is fully inserted in the card reader 16 with four bits low and four bits including the check bit high. Like the position of FIG. 10(d), the arithmetic control unit 13 first executes the process (1) above and then repeatedly executes the process (2) above. When the data of the coincidence memory becomes "100" in the steps S21 after the process (2) has been repeated, the arithmetic control unit 13 executes the steps S22 to S23 to S24 to make the insertion flag high, whereupon the content (card number) of the display memory is displayed on the display 18 for a given period of time.

FIG. 11 is explanatory of operation of the card reader 16 at the time of removing the card 4 from the card reader 16 after an article has been weighed and the price thereof has been computed.

FIG. 11(a) shows the position in which four bits are low and four bits including the check bit are high. In the flowchart of the main program, the insertion and removal flags are rendered low in the step P8. In the readout subprogram in the step P9, the arithmetic control unit 13 executes the steps S1 to S2 to S5 to S6 to S13 to S14 to S19, and then goes to the steps P10 to P6 . . . P8 in the main program as the removal flag remains low.

FIGS. 11(b-1) and 11(b-2) show the positions in which the card 4 is slightly pulled out and the phototransistors issue high and low outputs as they do not fully detect light. In FIG. 11(b-1), five bits including the check bit are low and three bits are high. In the readout subprogram, the steps S1 to S2 to S5 to S9 to S7 to S8 are executed. In the main program, the steps P10 to P1 to P2 to P3 to P4 are executed after the subprogram has been executed. In FIG. 11(b-2), six bits are low and two bits including the check bit are high. In the readout subprogram, the steps S1 to S2 to S5 to S6 to S13 to S14 to S15 to S16 to S27 to S17 to S18 are executed. This flow is different from the flow of FIG. 11(b-1) dependent on whether the check bit is high in the step S5 (whether the phototransistor detects light or not through the check bit hole). In the main program subsequent to the readout subprogram, the steps P10 to P1 to P2 to P3 to P4 are executed like the process of FIG. 11(b-1). Specifically, if the card 4 is slightly pulled out, the removal flag goes high and the program goes to the step P1 and following irrespectively of whether the card is in the position of FIGS. 11(b-1) or 11(b-2).

FIG. 11(c) shows the position in which the card 4 is completely removed from the card reader 16. In the step P3 of the readout subprogram, the steps S1 to S2 to S3 to S4 are executed in the flowchart of FIG. 9-1.

FIG. 12 illustrates operation of the card reader 16 when the card 4 is slightly pulled out of the card reader 16 in error and inserted again without being completely pulled out.

In the position of FIG. 12(a), the same process as that for the position of FIG. 11(a) is executed.

In FIG. 12(b), six bits are low and two bits including the check bit are high, and the same process as that for the position of FIG. 11(b-2) is executed.

FIG. 12(c) shows the position in which the card 4 is further pulled out to make all of the 8 bits low. After the steps S1 to S2 to S5 to S9 to S7 to S8 of the readout subprogram have been executed, the steps P4 to P2 of the main program are executed, and then the steps S1 to S2 to S5 to S8 to S11 to S12 to S9 of the readout subprogram are executed to render the removal flag high. Since the insertion flag remains low, the steps P4 to P2 to P3 of the main program are thereafter repeated.

FIG. 12(d) illustrates the position in which seven bits including the check bit are low and one bit is high. Inasmuch as the check bit is low, the same process as that for the position of FIG. 11(b-1) is executed.

FIG. 12(e) illustrates the position in which the card 4 is inserted back into the card reader 16, where four bits including the check bit are high and four bits are low. Like the position of FIG. 10(e), the step S14 of the readout subprogram is initially executed, and then the process due to number coincidence is repeated. When the coincidence number memory data becomes "100" in the step S21, the steps S22 to S23 to S24 are executed to make the insertion flag high, and the step P4 and following steps of the main program are executed. Specifically, if the card 4 is pulled out even slightly, then the removal flag goes high to cause the program to return to the step P1. By inserting the card 4 fully back into the card reader 16, the card number is read out properly to effect the weighing and price computing process.

A weighing system according to another embodiment will be described with reference to FIGS. 13 through 17.

Figure 13:
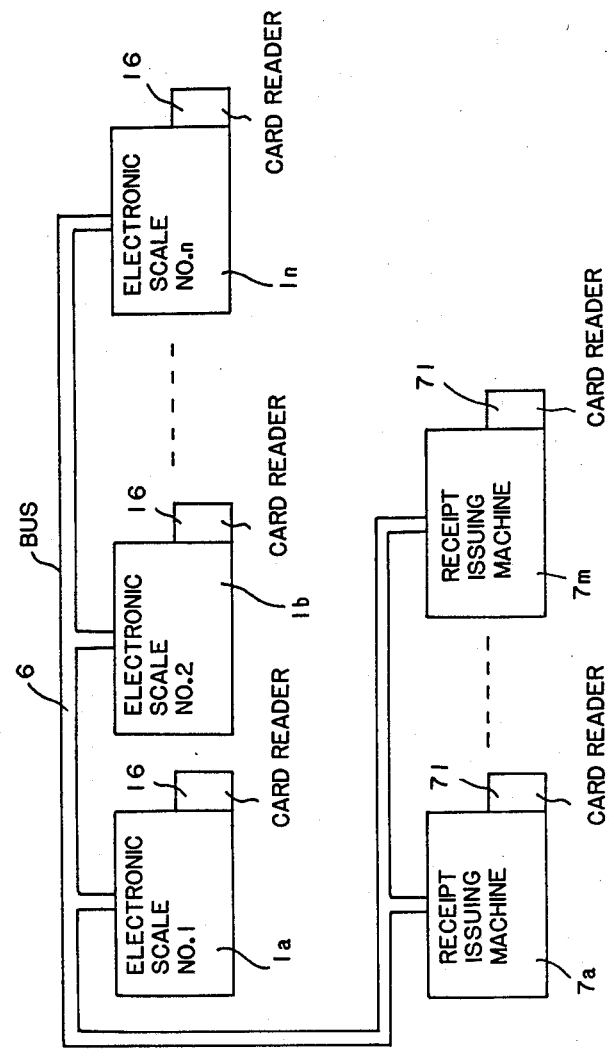
FIG. 13 is a block diagram of a weighing system according to another embodiment of the present invention.

FIG. 13 schematically illustrates the weighing system of this embodiment. The weighing system has a plurality of electronic scales 1a, 1b, . . . 1n interconnected by a bus 6 to each other and to a plurality of receipt issuing machines 7a through 7m. Each of the electronic scales 1a through 1n and the receipt issuing machines 7a through 7m has a card reader for reading the cards of customers and store clerks. Each of the electronic scales 1a through 1n is of the same construction as that of the electronic scale shown in FIG. 2, with the card reader 16 capable of receiving the card 4.

If a card is handed to a customer at the entrance of a store, then the store clerk will receive the card from the customer and insert the card into an electronic scale. After the article has been weighed and its price has been labeled, the card is returned to the customer and will be retrieved when the customer makes a payment at a check-out counter. Alternatively, one store clerk carries a card, rather than giving it to a customer, and follows the customer and uses the card to weigh the articles purchased by the customer and attach price labels to the articles. In the latter mode of use, the receipt issuing machines 7a through 7m are totaled by the store clerks to produce data indicating the sales by the store clerks.

Figure 14:
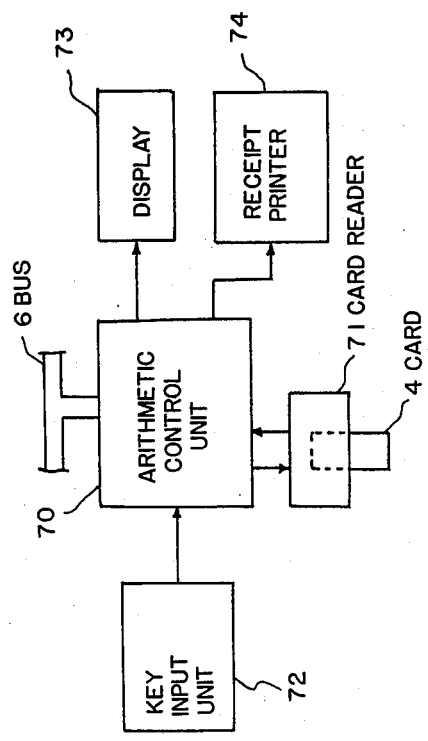
FIG. 14 is a block diagram of a receipt issuing machine in the weighing system of FIG. 13.

As shown in FIG. 14, each of the receipt issuing machines 7a through 7m has a card reader 71 for reading information from the card 4 and delivering the information to an arithmetic control unit 70 which comprises a microcomputer, a key input unit 72, a display 73 for displaying necessary items such as the card number of the card 4, and a receipt printer 74 for printing the details of purchased articles on a receipt. The receipt printer 74 also serves to total and print data representing amounts of sales by time zones and article classifications.

Operation of the weighing system shown in FIGS. 13 and 14 will be described with reference to the flowcharts of FIGS. 15 through 17.

First, the following preparation processes (1) through (3) are performed.

(1) Dependent on the layout of a store in which the weighing system is incorporated, the electronic scales 1a through 1n and the receipt issuing machines 7a through 7m are positioned and interconnected by the bus 6.

(2) With each of the electronic scales 1a through 1n and the receipt issuing machines 7a through 7m in an initialization mode, machine numbers (polling numbers) from No. 1 are assigned, and one of the receipt issuing machines is registered as a master machine while the others are used as slave machines.

(3) Different article data (names, unit prices etc.) are set in the electronic scales.

Figures 1, 15:
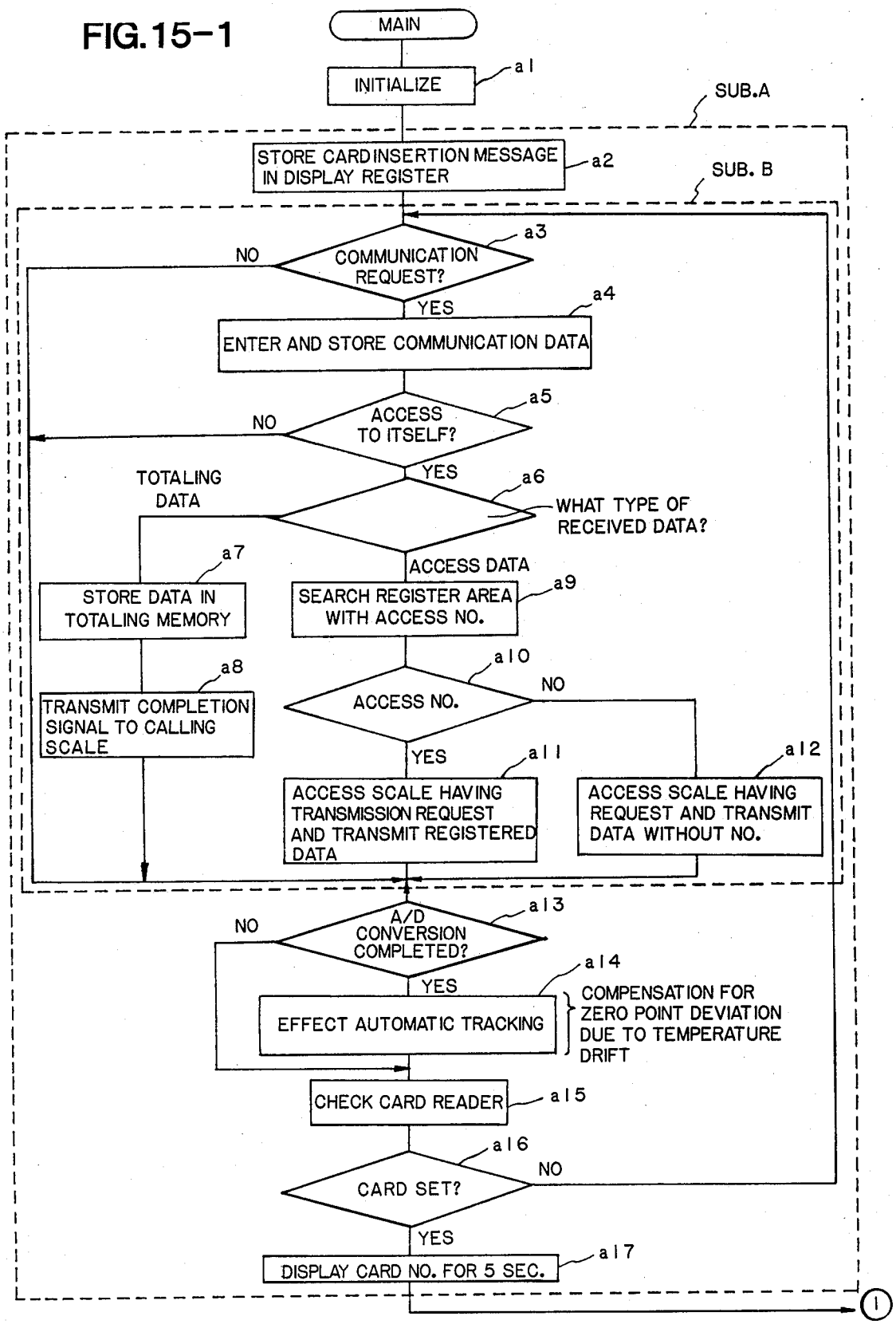
Figures 2, 15:
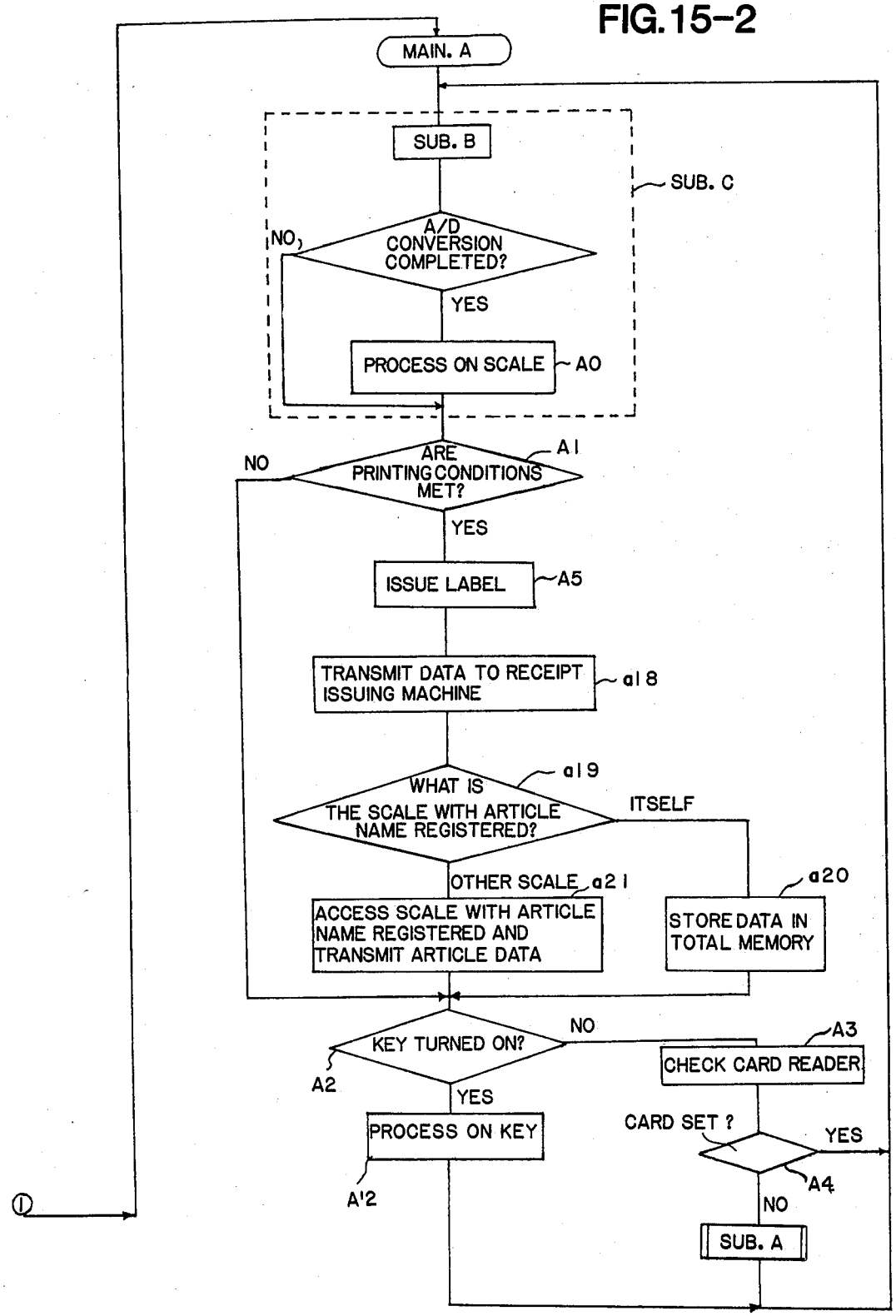
Figure 16:
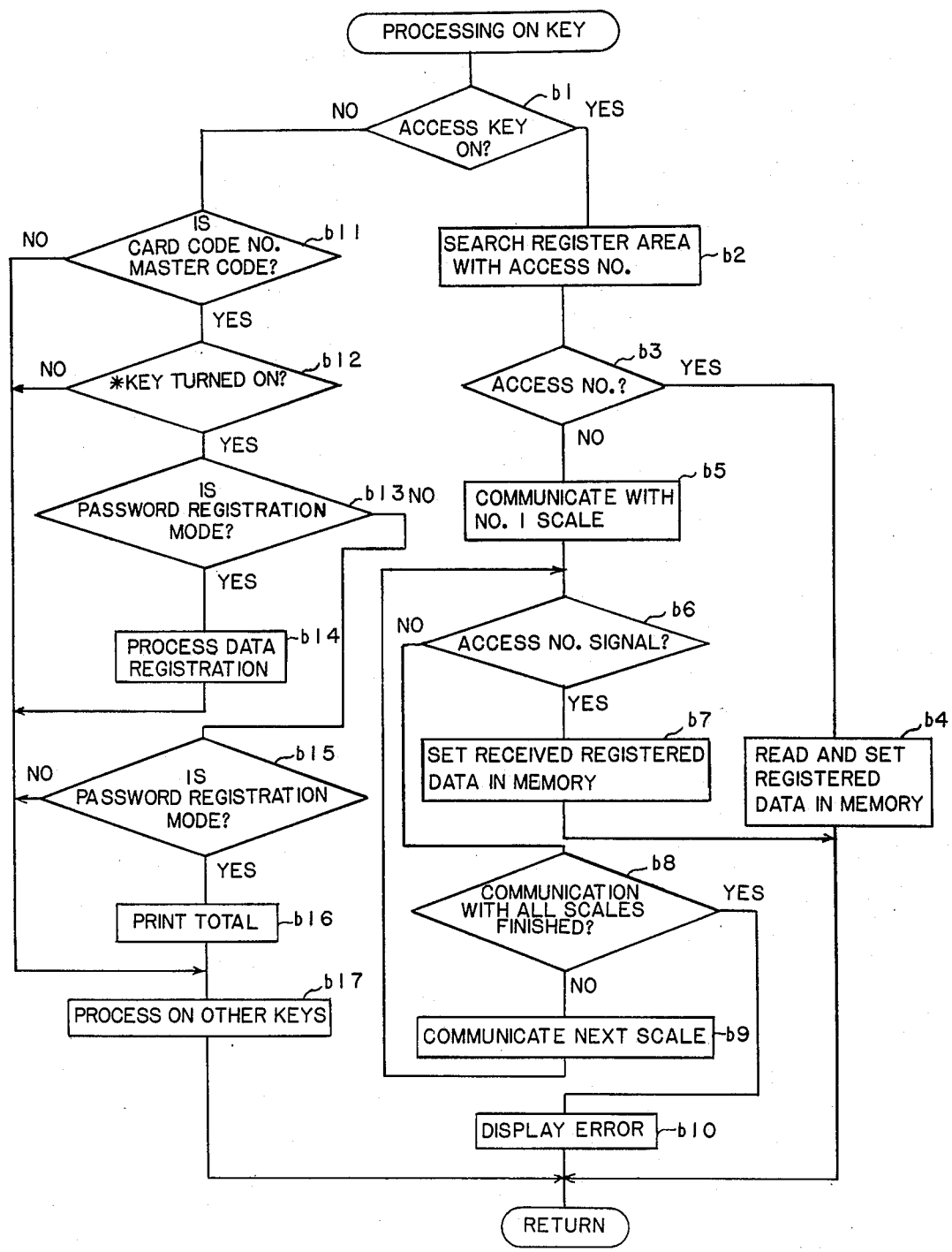

FIGS. 15-1 and 15-2 show a flowchart of programmed operation for each electronic scale. The operation of the electronic scale will be described with reference to this flowchart.

(1) The power supply is switched on to initialize the electronic scale in a step a1. Then, a message indicating card insertion is stored in a display register in a step a2. The content of the display register is issued to and displayed on the display upon interrupt at a constant cyclic period.

(2) If there is a communication request in a step a3, communication data is entered and stored in a step a4. A step a5 determines access and a step a6 determines the type of the received data. If the received data is single-article totaling data, the data is stored in the total memory corresponding to the access number in a step a7, and a completion signal is transmitted to the calling electronic scale in a step a8.

(3) If the received data is access data, the register area of the memory is searched with the access number thereof in a step a9. If there is an access number in a step a10, then the electronic scale having the transmission request is accessed to transmit registered data thereto in a step a11. If there is no access number in the step a10, then the electronic scale having the transmission request is accessed to transmit data with no number thereto in a step a12.

(4) Then, the completion of operation of the A/D converter 12 is checked in a step a13. An automatic tracking process is effected in a step a14 to compensate for a zero point deviation arising from a temperature drift, and then the card reader is checked in a step a15.

If the card is determined to be set in a step a16, then the card number is displayed for 5 seconds, for example, in a step a17. Then, the program goes to a main routine MAIN. A (FIG. 15-2).

Therefore, unless the card is inserted, each electronic scale does not operate, even if the power supply is switched on, and operates only as a transmitter/receiver. Where the card is carried by a customer, the clerk receives the card and inserts it into the card reader 16. Where the card is carried by the clerk, it is inserted by the clerk into the card reader 16.

(5) In the main routine MAIN. A, the electronic scale repeats a subroutine C to a step A1 (for checking printing conditions) to a step A2 (for checking if key is turned on) to a step A3 (for checking the card reader) to a step A4 (for checking if the card is set) to the subroutine C, during which time the other electronic scales are monitored for access therefrom.

The processing on the scale (the step A0) in the subroutine C includes:
 (1) Automatic tracking;
 (2) Scale stabilization;
 (3) Conversion of the output of the A/D converter into a weight value;
 (4) Computation of the amount due; and
 (5) Conversion of the computed result into a segment code and storage thereof into the display register.

The weight, unit price, price, and other data for an article are displayed by applying the content of the display register to the display upon interrupt at a constant cyclic period.

(6) When an article access number is entered by keys in the step A2, the program goes to the key processing routine of FIG. 16, which will be described below.
 (1) If an access key is turned on in a step b1, the register area of the memory which stores the name, unit price, effective date, and other data of the article is searched with the access number in a step b2. If the access number is registered in the memory of itself (electronic scale) in a step b3, the registered data is read out, the name data is converted into a dot image and stored in a printing buffer memory, and the unit price is stored in a unit price register in a step b4.
 (2) If the access number is not registered in its own memory, then other electronic scales are accessed by polling to request transmission of the registered data. Since the other electronic scales monitor each other for access during their own processing, they search the registered area of their own memories with the received access number upon being accessed. If the access number is located, the electronic scale having issued the access request is accessed to transmit the registered data thereto. If there is no data, data with no access number is transmitted (subroutine B). The electronic scale successively communicates with the other electronic scales until the registered data is transmitted. The above process is repeated until communication with all of the electronic scales is over. If there is no registered data as a result of communication with all of the electronic scales, then an error is displayed (steps b5 through b10).
 (3) If the access key is not turned on in the step b1, then a step b11 checks to determine if the card code number is a master code (carried by only the store owner). If it is a master code, then a step b12 checks if an * key 154 on the key input unit 15 (FIG. 2) is turned on. If the * key 154 is turned on, then a step b13 ascertains whether a password number entered through the ten keys 151 is a registration mode. If the password number is a registration mode, then article data is registered in a step b14. If the password number is not a registration mode but a totaling mode in a step b15, the total (single-article total) of sales amounts by the article names is printed in a step b16, and then other key-initiated processes such as tare setting and zero key and ten-key processes are effected in a step b17.

(7) Referring back to the flowchart of FIGS. 15-1 and 15-2, after the article data is set, the article on the scale is stabilized, the weight and price are computed and displayed, and the printing conditions are met, a label is printed in a step A5. Then the data such as the printed name, unit price, weight, and amount due are transmitted, together with the code number of card 4 carried by the customer or clerk, to the receipt issuing machine serving as the master machine in a step a18. Then, a step a19 checks for the electronic scale in which the name of the article is registered. If the electronic scale is itself, the data is stored in the total memory corresponding to the access number in a step a20. If the electronic scale is another electronic scale, then it is accessed and the single-article data is transmitted thereto in a step a21. The single-article data contains the sold number, weight, and price of the accessed articles.

Operation of the receipt issuing machines 7a through 7m will be described below. All of the receipt issuing machines 7a through 7m will operate under the same program. However, in the initialization mode, the receipt issuing machine selected as the master machine can print the totals by the clerks, the time zones, the large classes, and the middle classes, and can also set and register master codes indicating a classification and a store owner. The data transmitted from each electronic scale is stored in the master machine. When a customer pays at a receipt issuing machine (slave machine) other than the master machine, the data on the purchased article is transmitted from the master machine to the slave machine to enable the latter to issue a receipt.

Figures 1, 17:
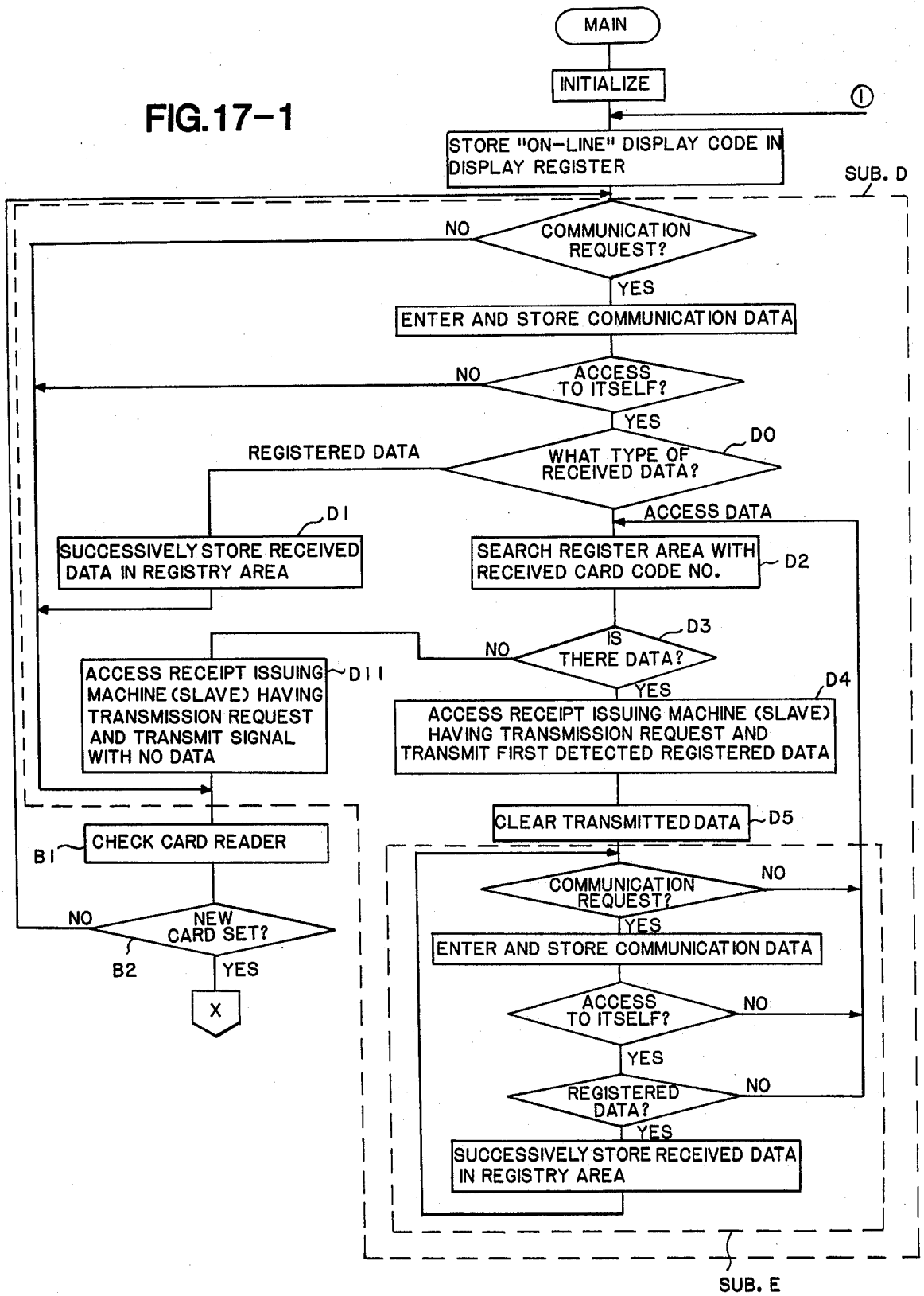
Figures 2, 17:
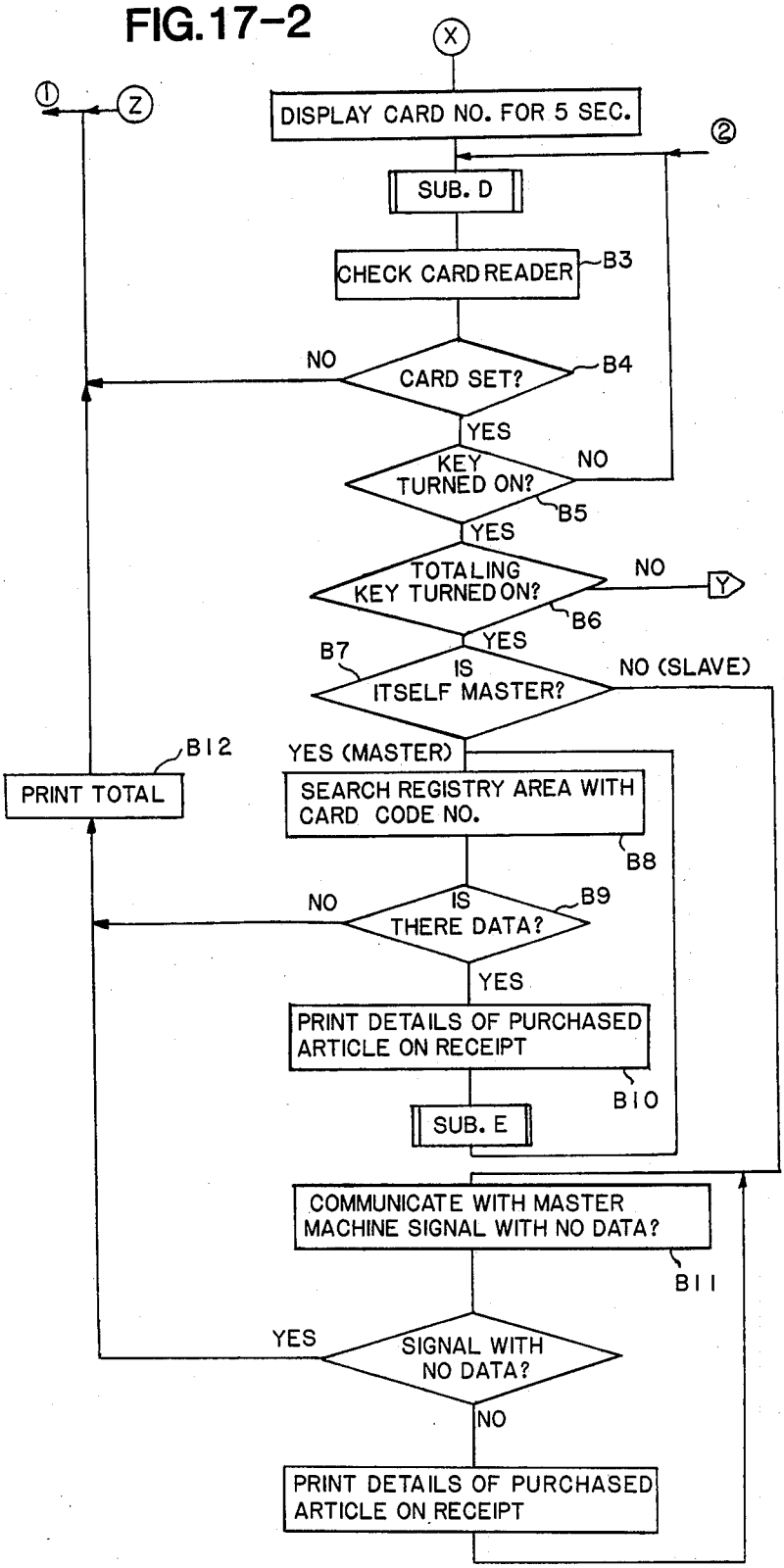
Figures 3, 17:
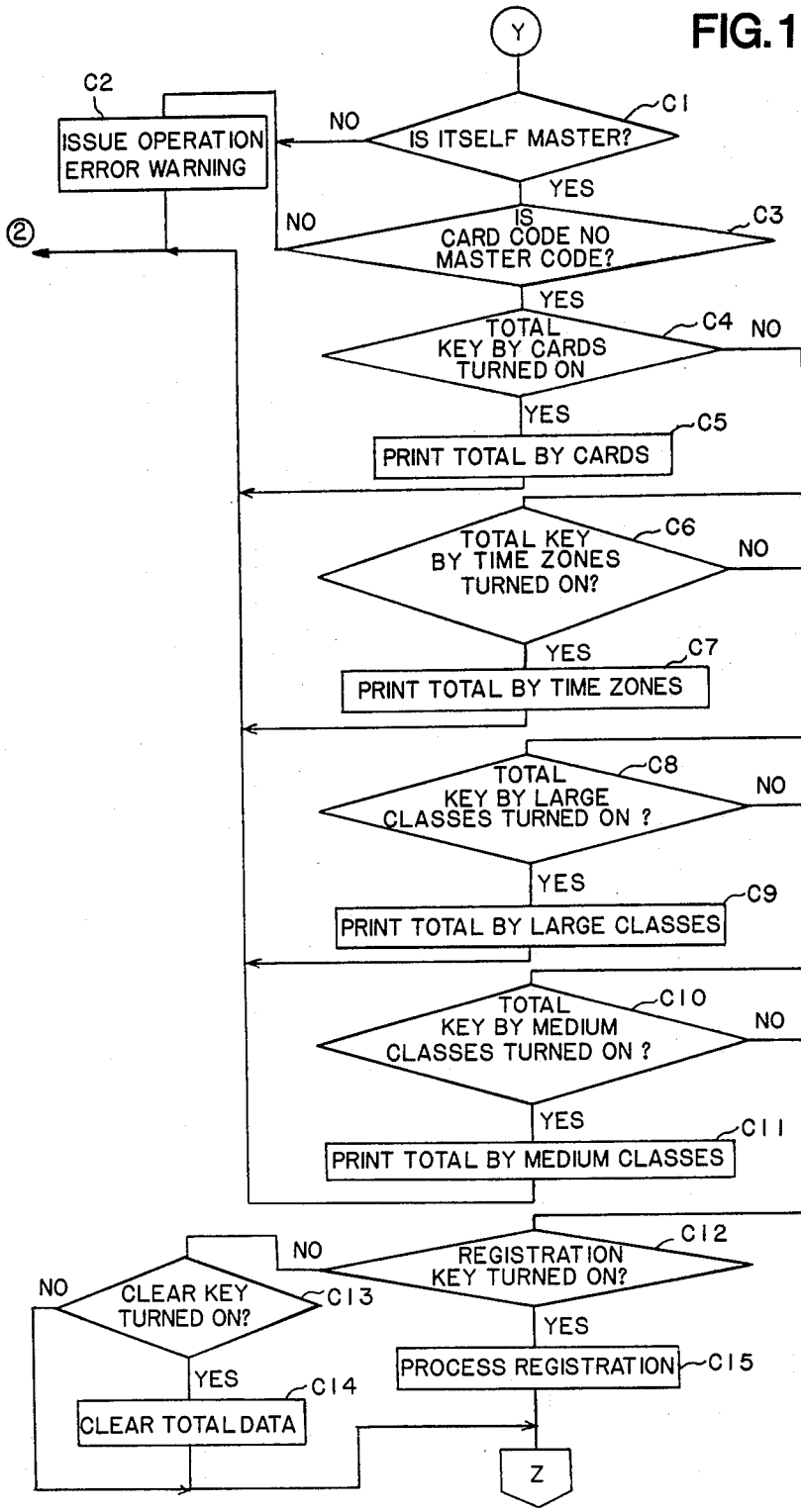

FIGS. 17-1 through 17-3 are a flowchart of operation of the receipt issuing machines.

(1) When the power supply is switched on, each receipt issuing machine is initialized, and thereafter the message "ON-LINE" is displayed on the display. Then, while monitoring the other electronic scales and the receipt issuing machine (master machine) for access (subroutine D), the receipt issuing machines check if the card is inserted.

(2) Data is randomly transferred from the electronic scales to the master machine. Each time the receipt issuing machines are accessed by the master machine, the operation thereof goes from a step D0 (for checking received data) to a step D1 for storing the received data successively into the register area in order of reception.

(3) Upon a request from a slave machine for data transmission, the process from the step D0 to a step D2 (for searching the area with the received code number) to a step D5 (for checking if there is data) to a step D4 (for acessing the slave receipt issuing machine which gives the transmission request and transmitting first detected registeted data thereto) to a step D5 (for clearing the registered data which has been transmitted) to a subroutine E to the step D2 is repeated to read out and transfer, in order of registration, the purchase data of a particular customer which are randomly stored in the register area. During this time, the master machine monitors the electronic scales for access (the subroutine E). The subroutine E includes the steps of checking if there is a communication request, storing commucation data, checking if itself is accessed, checking if there is registered data, and successively storing received data in the register area.

(4) A slave machine receives data transmitted from the master machine only when it request the master machine for data. Therefore, the steps D2 through D11 are not executed in the slave machines.

(5) The amount due for the purchased article is paid at a closely located receipt issuing machine. The customer (clerk) card is inserted into the card reader of the receipt issuing machine, and the totaling key is depressed. Before the card is inserted, the loop from the subroutine E to a step B1 (for checking the card reader) to a step B2 (for setting a new card) to the subroutine D is repeated. When the card is inserted, the program goes from the step B2 to X for repeating the loop from the subroutine D to a step B3 (for checking the card reader) to a step B4 (for setting the card) to a step B5 (for checking if keys are turned on) to the subroutine D. Then, if the totaling key is depressed, the program jumps from a step B6 (for checking if the totaling key is depressed to a step B7 (for checking if itself is the master machine).

(6) In the master machine, the register area is searched with the received card code number in a step B8. If there is data in a step B9, it is read out and details of the purchased articles are printed on a receipt in a step B10. After the details of one article have been printed, access from the electronic scales is checked in the subroutine E, and if there is any access, the registered data is received and stored in the registry area. If there is no access, the program goes back to the step B8 to search the register area for the data of a next article purchased.

While monitoring access from the electronic scales, the receipt issuing machine successively print the details of articles purchased by the customer and finally prints the total in a step B12, followed by the display of "ON-LINE". After the message "ON-LINE" has been displayed, the subroutine D is executed, and then the insertion of the customer or clerk card is checked. While the card remains inserted, the program does not jump to the steps following X. The process of X is not executed until the card is pulled out and inserted again.

(7) The slave machines are not required to receive data transmitted from the electronic scales. When the totaling key is pushed, the registered data is received in a step B11 and printed as the details of the purchased article on the receipt. When a slave machine requests the master machine for data transmission in the step B11, the master machine repeats the loop from the step D2 to D3 to D4 to D5 to the subroutine E to the step D2 for transmitting the registered data.

(8) The data is totaled and printed by the master machine as follows:
  (1) A step c1 checks if itself is the master machine, and a step c3 checks if the card code number is a master code. If not the master machine or if not the master code, a step c2 gives an operation error warning, and the subsequent process will not be executed. Therefore, unless the store owner uses his master card, various data items are not totaled and printed, so that only the owner of the master card can supervise the articles to be sold.
  (2) Dependent on operation of a totaling key by the cards (the clerks) in a step c4, a totaling key by the time zones in a step c6, a totaling key by the large article classes in a step c8, and a totaling key by the medium article classes in a step c10, the details of the articles are totaled and printed in steps c5, c7, c9, and c11, respectively.

(3) If the register key is turned on in a step c12, various data items are registered in a step c15. If a clear key is turned on in a step c13, the totaled data is cleared in a step c14.

Unless the total between the previous totaling time and the present totaling time (for example, the grand total by the days and the total data) are cleared, the grand totals that are added, such as the grand totals by the weeks or months are simultaneously printed on the receipt.

FIG. 18 shows a weighing system according to still another embodiment of the present invention. The illustrated weighing system has a card distribution corner 100 at the entrance of a store. A card distributed at the card distribution corner 100 is a magnetic card or an IC card on which information can be written and from which stored information can be read. The weighing system also includes a plurality of electronic scales 10a through 10n each having a card reader capable of reading information from and writing information on the card. A register 701 having a card reader for reading information from the card is placed in the store and connected by a bus 60 to a totaling machine 30. A card retrieval corner 200 is located at the exit of the store.

One example of use of this embodiment of the weighing system is as follows:

A card is given to an incoming customer at the card distribution corner 100. The customer having received the card gives the card to the clerk when a weighed article is bought. The clerk inserts the received card into the card reader of the nearby electronic scale to weigh the article and apply a price label thereto. The charge is written on the card.

Each time the card is used, the purchase information is recorded on the card.

The amount due is paid at the register 701 when the card carried by the customer and bearing the purchase information is inserted into the card reader of the register 701, which reads the recorded information and computes the total of the prices of the purchased articles.

The information read by the register 701 is transferred to the totaling machine 30 which totals the data by the articles, the time zones, and the like.

After the charge has been paid, the recorded content of the card is cleared and the card is collected at the card retrieval corner 200.

Another example of use of the weighing system will be described below.

A card with a prescribed amount of money registered is sold to a customer at the card distribution corner 100. The customer uses the card to purchase a weighed article in the same manner as described above.

The purchase information is stored on the card, and the balance available on the card can be displayed on the display of any electronic scale. More specifically, the amount of money paid by the customer to buy the card is stored on the card and the price of the article purchased by the customer are read, and the difference between the stored amount and the price is displayed as the balance.

If the price of the purchased article is lower than the amount of money paid to get the card, then the card can be used by the customer for buying another article. If the price of the purchased article is higher than the card price, then another card is purchased or the difference is paid at the register 701.

The charge can be paid altogether at the register 701. As an alternative, the balance can be computed by an electronic scale each time an article is purchased, and if there is still enough balance available, the new balance is written on the card, and any charge may be paid at the place of purchase. Where the charge is paid at the electronic scale, the price of the purchased article is subtracted from the amount of money stored on the card to compute a balance which is stored again o the card. Then, when another article is bought, the stored balance is read out of the card, and the price of the purchased article is subtracted again from the balance to compute a new balance that is stored on the card.

Any card which is no longer used is collected, and the recorded information is erased therefrom. Then, the price of the card is stored therein, and the card is placed at the card distribution corner.

The totaling machine 30 and the electronic scales 10a through 10n may be interconnected by a bus so that purchase infomration may be totaled.

Although certain preferred embodiments have been shown and described, it should be understood that many changes and modifications may be made therein without departing from the scope of the appended claims.

What we claim is:

1. A weighing system for weighing articles purchased and for computing purchase data including the prices of the articles based on weight data, comprising:
   cards containing customer codes for discriminating the customers; and
   a plurality of electronic scales for weighing the articles, each of said electronic scales including:
   a card reader for reading the customer codes from the cards;
   means for storing the purchase data of the articles corresponding to the respective customer codes;
   means for transmitting the purchase data stored by the electronic scale; and
   means for receiving and totaling the purchase data transmitted by the other of said electronic scales, according to the respective customer codes.

2. A weighing system according to claim 1, further comprising a totaling machine, connected to said electronic scales, for totaling the data transferred from said electronic scales by article classification, time zone and clerk.

3. A weighing system for weighing articles purchased and for computing purchase data including the prices of the articles based on weight data, comprising:
   cards containing customer codes for discriminating customers;
   a plurality of electronic scales for weighing the articles and for computing the purchase data including the prices of articles which have been weighed, each of said electronic scales including:
   a card reader for reading the customer codes from the cards;
   means for storing the purchase data of the articles corresponding to the respective customer codes;
   means for transferring the purchase data stored by said electronic scale; and
   a receipt issuing machine connected by said transferring means to the other of said electronic scales and having means for storing the purchase data transferred from said other electronic scales, said receipt issuing machine including means for reading the purchase data and for printing the prices of the articles on receipts respectively corresponding to the codes for the customers.

4. A weighing system according to claim 3, wherein each of said electronic scales has a label printer.

5. A weighing system according to claim 3, wherein each of said electronic scales is arranged so that it will serve as a transmitter/receiver when one of the cards is not inserted in said card reader and will function as a scale when one of the cards is inserted in said card reader.

6. A weighing system according to claim 3, wherein said electronic scales are interconnected by said bus so that print data for different articles which are registered in the respective electronic scales can be accessed by any of said electronic scales.

7. A weighing system according to claim 3, wherein each of said electronic scales is arranged such that it will not enter a data registration mode unless a card having a predetermined code is inserted in its card reader.

8. A weighing system according to claim 3, wherein said receipt issuing machines are interconnected so that all of the purchase data for any of the customers can be printed on a receipt by any of said receipt issuing machines.

9. A weighing system according to claim 8, wherein at least one of said receipt issuing machines is capable of totaling the purchase data transferred from said electronic scales by article classification, time zone, and clerk.

10. A weighing system according to claim 9, wherein said at least one of the receipt issuing machines is arranged such that it cannot total and print the purchase data until a master card is inserted in its card reader.

11. A weighing system according to claim 9, wherein said at least one of said receipt issuing machines is arranged such that unless the total between the previous totalling time and the present totaling time, are cleared, the grand totals that are added will simultaneously be printed on the receipt.

12. A weighing system according to claim 1, wherein the codes on said cards correspond to clerk numbers.

13. A weighing system according to claim 12, wherein said cards are also clerk name cards.

14. A weighing system according to claim 1, wherein each of said cards has a base with a plurality of holes defined in one surface of the base, and wherein the holes are selectively extended through the base to indicate a card number for the card.

15. A weighing system according to claim 1, wherein said storing means comprises a memory, wherein said card reader includes a plurality of sensors for reading information on the cards, each of said cards having a base and containing information including a check bit on the base, wherein when one of the cards is inserted in said card reader, the insertion of the card is confirmed by a transition of outputs of said sensors from detection of the check bit to non-detection of the check bit to detection of the check bit and also by a simultaneous transition of all of the outputs of said sensors to non-detection of the information on the card, wherein the information on the card is read as the outputs of said sensors and stored in said memory, and wherein the information on the card is read a plurality of times as the outputs of said sensors and compared with the content of said memory a prescribed number of times by the electronic scale for coincidence.

16. A weighing system for weighing articles purchased and for computing purchase data including the prices of the articles based on weight data, comprising:
cards capable of storing at least price data for articles purchased by the customers;
a plurality of electronic scales for weighing the articles and computing the prices of the articles, each of said electronic scales including:
means for storing the data on said cards and for computing the prices of the articles based on the data;
means for reading out the data from said cards; and
a register, coupled to said means for reading out the data, for totaling the prices of the articles purchased by the customers based on the data as read out.

17. A weighing system for weighing articles purchased and for computing purchase data including the prices of the articles based on weight data, comprising:
cards capable of storing at least an amount of money prepaid by the customers and price data for articles purchased by the customers; and
a plurality of electronic scales for weighing the articles and computing the prices of the articles, each of said electronic scales including:
means for storing at least the price data on said cards;
means for reading the amount of money and the price data from said cards;
arithmetic means for subtracting the price of an article purchased by one of the customers from the amount of money read by said reading means; and
means for computing the prices of the articles.

18. A weighing system for weighing articles purchased and for computing purchase data including the prices of the articles based on weight data, comprising:
cards capable of storing at least an amount of money prepaid by the customers and a balance produced by subtracting the price of an article purchased by one of the customers from the amount of money; and
a plurality of electronic scales for weighing the articles, each of said electronic scales including:
means for reading the balance from the card;
arithmetic means for subtracting the price of an article purchased by the customer from the balance read by said reading means; and
means for computing the prices of the articles.

19. A weighing system according to claim 3, wherein the codes on said cards correspond to clerk numbers.

20. A weighing system according to claim 19, wherein said cards are also clerk name cards.

21. A weighing system according to claim 3, wherein each of said cards has a base with a plurality of holes defined in one surface of the base, and wherein the holes are selectively extended through the base to indicate a card number for the card.

22. A weighing system according to claim 12, wherein each of said cards has a base with a plurality of holes defined in one surface of the base, and wherein the holes are selectively extended through the base to indicate a card number for the card.

23. A weighing system according to claim 13, wherein each of said cards has a base with a plurality of holes defined in one surface of the base, and wherein the holes are selectively extended through the base to indicate a card number for the card.

24. A weighing system according to claim 3, wherein said storing means comprises a memory, wherein said card reader includes a plurality of sensors for reading information on the cards, each of said cards having a base and containing information including a check bit on the base, wherein when one of the cards is inserted in said card reader, the insertion of the card is confirmed by a transition of outputs of said sensors from detection of the check bit to non-detection of the check bit to detection of the check bit and also by a simultaneous transition of all of the outputs of said sensors to non-detection of the information on the card, wherein the information on the card is read as the outputs of said sensors and stored in said memory, and wherein the information on the card is read a plurality of times as the outputs of said sensors and compared with the content of said memory a prescribed number of times by the electronic scale for coincidence.

* * * * *

UNITED STATES PATENT AND TRADEMARK OFFICE
CERTIFICATE OF CORRECTION

PATENT NO. : 4,724,306

DATED : February 9, 1988

INVENTOR(S) : TAKASHI KITAOKA ET AL.

It is certified that error appears in the above-identified patent and that said Letters Patent is hereby corrected as shown below:

```
Column 1, line 21,    after "register" insert --.--;
          line 36,    "weiging" should be --weighing--.
Column 2, line 8,     "th" should be --the--;
          line 30,    "presen" should be --present--.
Column 4, line 19,    delete "on".
Column 6, line 14,    "de energizes" should be --de-energizes--
Column 14, line 1,    "commucation" should be --communication--
           line 23,   after "depressed" insert --)--.
Column 16, line 11,   "o" should be --on--;
           line 22,   "infomration" should be --information--.
```

Signed and Sealed this

Nineteenth Day of July, 1988

Attest:

DONALD J. QUIGG

Attesting Officer

Commissioner of Patents and Trademarks